United States Patent
Zia

(10) Patent No.: US 12,178,779 B2
(45) Date of Patent: Dec. 31, 2024

(54) BLOOD STORAGE CONTAINER CONTAINING AQUEOUS COMPOSITION FOR THE STORAGE OF RED BLOOD CELLS

(71) Applicant: Hemerus Medical, LLC, St. Paul, MN (US)

(72) Inventor: Majid Zia, St. Paul, MN (US)

(73) Assignee: Hemerus Medical, LLC, St. Paul, MN (US)

( * ) Notice: Subject to any disclaimer, the term of this patent is extended or adjusted under 35 U.S.C. 154(b) by 0 days.

(21) Appl. No.: 18/209,877

(22) Filed: Jun. 14, 2023

(65) Prior Publication Data

US 2023/0338235 A1 Oct. 26, 2023

Related U.S. Application Data

(62) Division of application No. 14/422,735, filed as application No. PCT/US2013/056190 on Aug. 22, 2013, now Pat. No. 11,730,676.

(60) Provisional application No. 61/692,048, filed on Aug. 22, 2012.

(51) Int. Cl.
| | |
|---|---|
| *A61J 1/10* | (2006.01) |
| *A01N 1/02* | (2006.01) |
| *A61J 1/05* | (2006.01) |
| *A61J 1/14* | (2023.01) |

(52) U.S. Cl.
CPC .............. *A61J 1/10* (2013.01); *A01N 1/0226* (2013.01); *A01N 1/0263* (2013.01); *A61J 1/05* (2013.01); *A61J 1/1468* (2015.05)

(58) Field of Classification Search
None
See application file for complete search history.

(56) References Cited

U.S. PATENT DOCUMENTS

2002/0009705 A1* 1/2002 Lucas .................. B01J 3/04
514/13.8

FOREIGN PATENT DOCUMENTS

WO WO-2006088455 A1 * 8/2006 ............... A01N 1/00

OTHER PUBLICATIONS

Dumont, Larry et al. Exploratory in vitro study of red blood cell storage containers formulated with an alternative plasticizer. vol. 52, Jul. 2012 Transfusion. pp. 1439-1445. (Year: 2012).*
Simmchen, Juliane et. al. Progress in the Removal of Di-[2-Ethylhexyl]-Phthalate as Plasticizer in Blood Bags. Transfusion Medicine Reviews, vol. 26, No. 1 Jan. 2012: pp. 27-37. (Year: 2012).*

* cited by examiner

*Primary Examiner* — Nghi V Nguyen
(74) *Attorney, Agent, or Firm* — Nancy C. Wilker

(57) ABSTRACT

A blood storage container along with an aqueous composition for the storage of packed red blood cells is described. In a preferred embodiment, the container is not made of DEHP plasticizer. In some embodiments, the container is made from a polymeric material and a non-DEHP plasticizer. In some embodiments, the aqueous composition is made of about 1 to about 3 mM adenine, about 20 to about 115 mM dextrose, about 15 to about 60 unmetabolizable membrane-protectant sugar, about 20 to about 30 mM sodium bicarbonate, and about 4 to about 20 mM disodium phosphate. In a most preferred embodiment, the DEHP-lacking container is made from a PVC polymeric material and a DINCH plasticizer and the aqueous composition is made of about 2 mM adenine, about 80 mM dextrose, 55 mM unmetabolizable membrane-protectant sugar, about 26 mM sodium bicarbonate, and about 12 mM disodium phosphate.

26 Claims, 12 Drawing Sheets

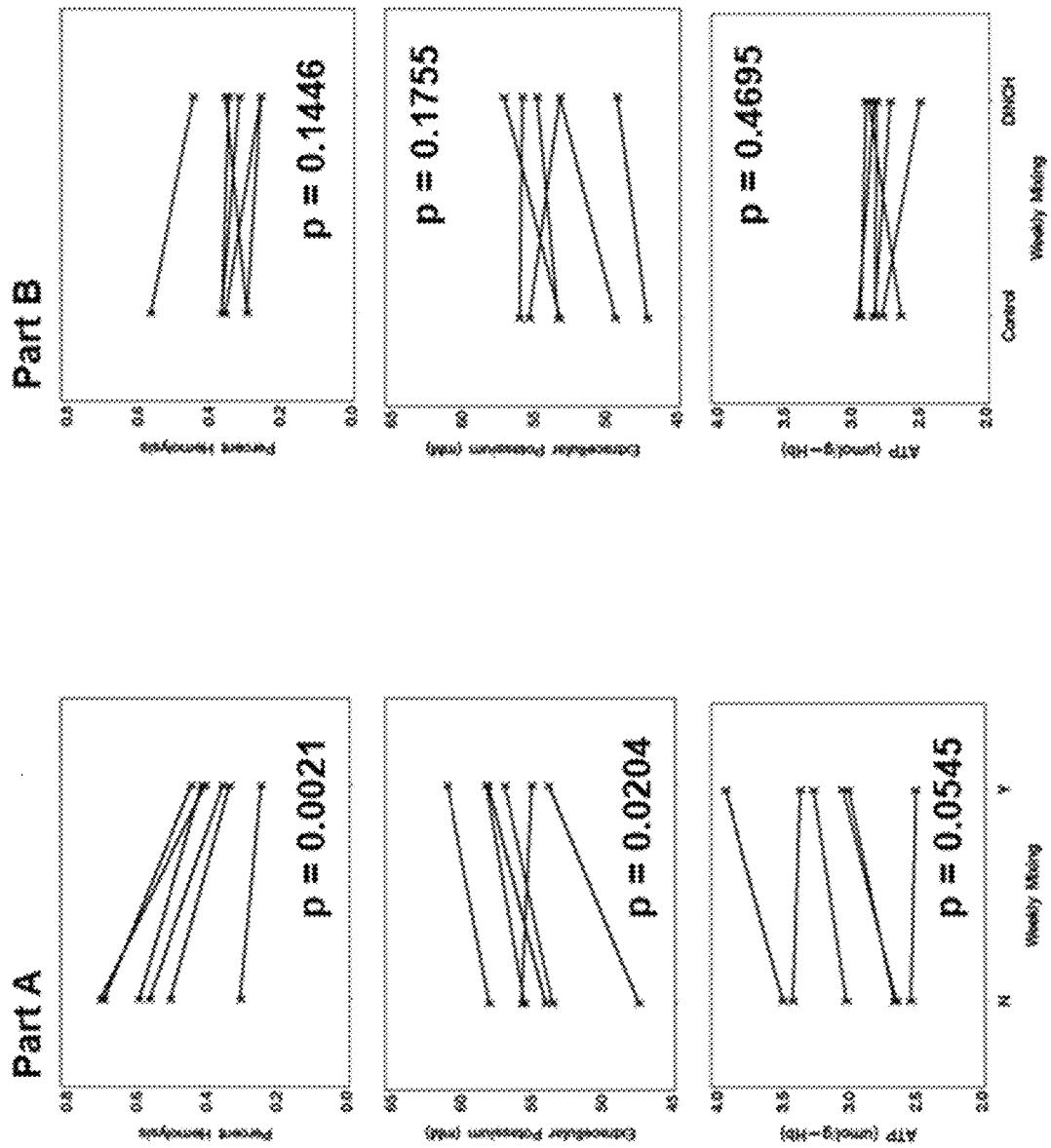
Figure 1—Paired outcomes at day 42 of storage (Dumont et al., supra.)

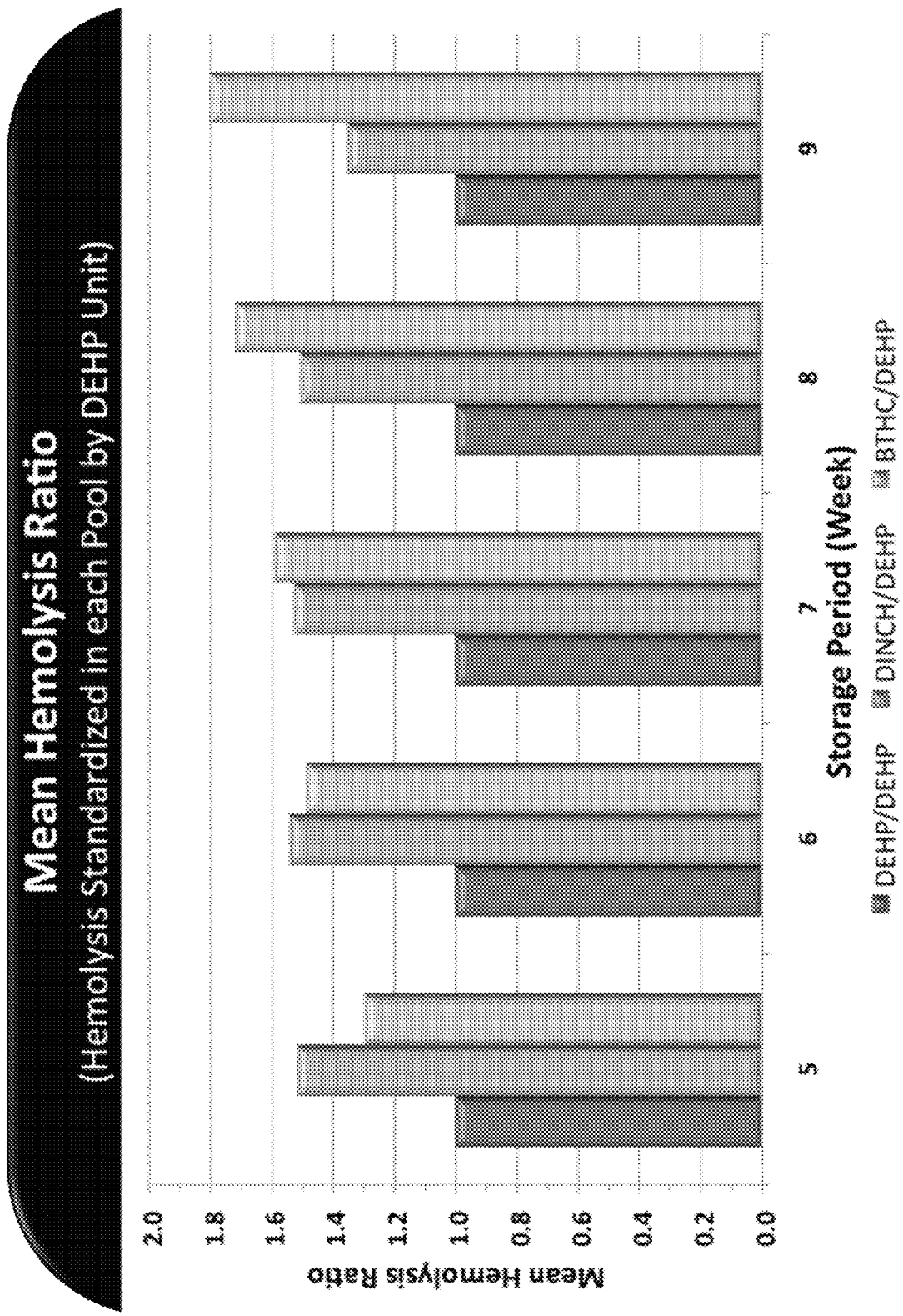
Figure 2: Red blood cells stored 42 days in alternative plasticized PVC containers resulted in on average 50% higher hemolysis than in DEHP plasticized container

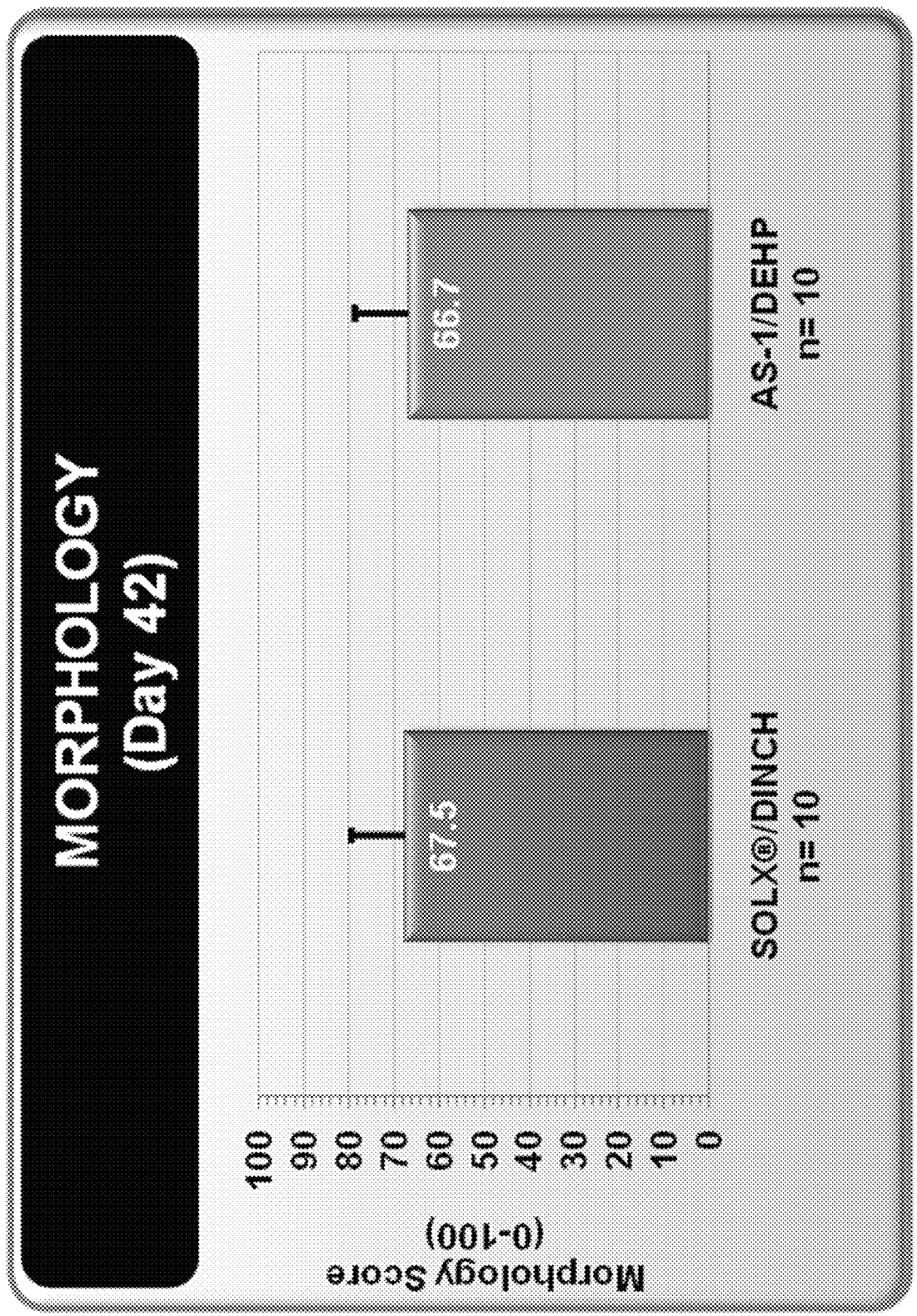
Figure 3: No statistical difference in RBC morphology at day 42

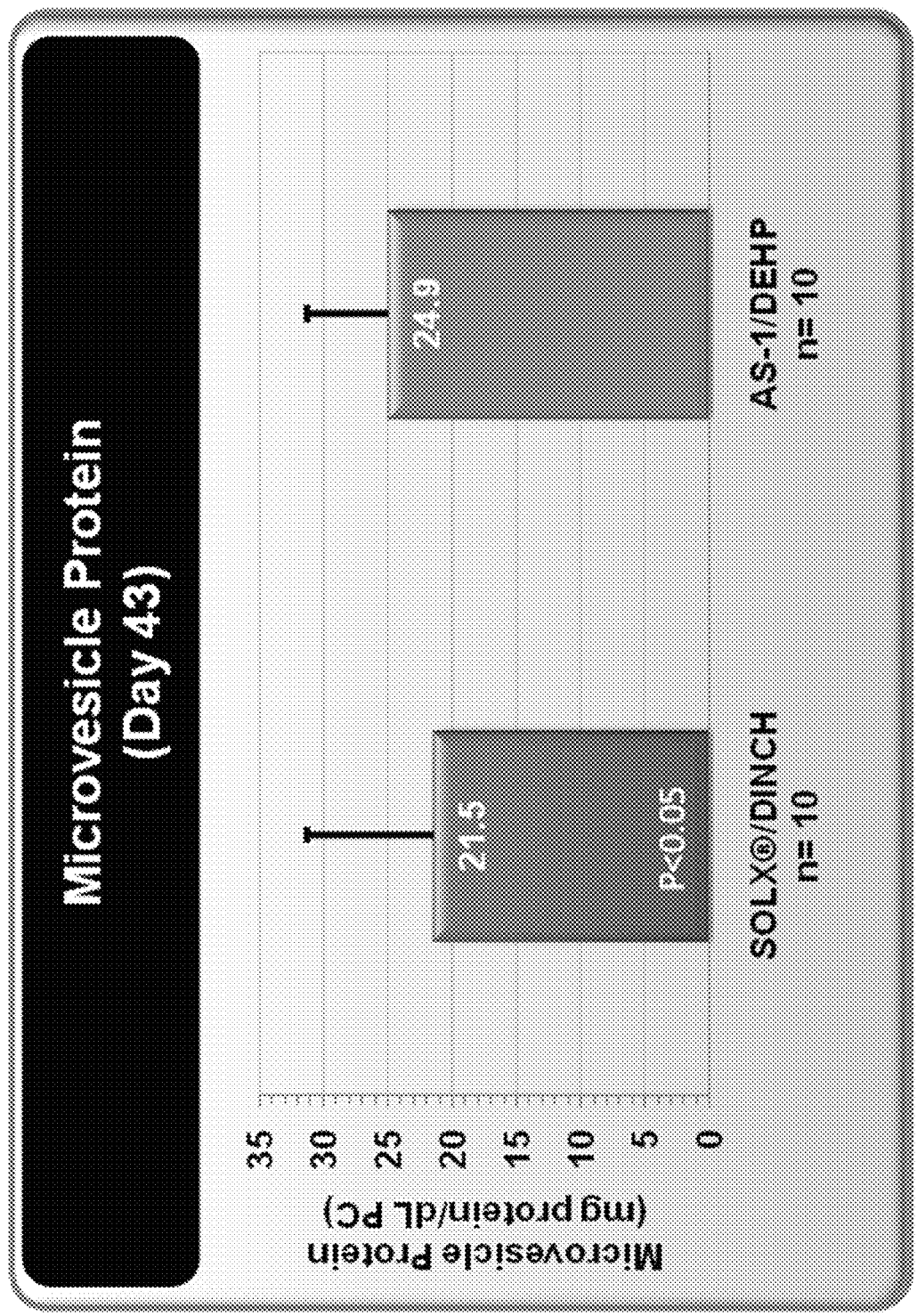
Figure 4: Lower microvesicle protein shedding in SOLX/DINCH compared to AS-1/DEHP

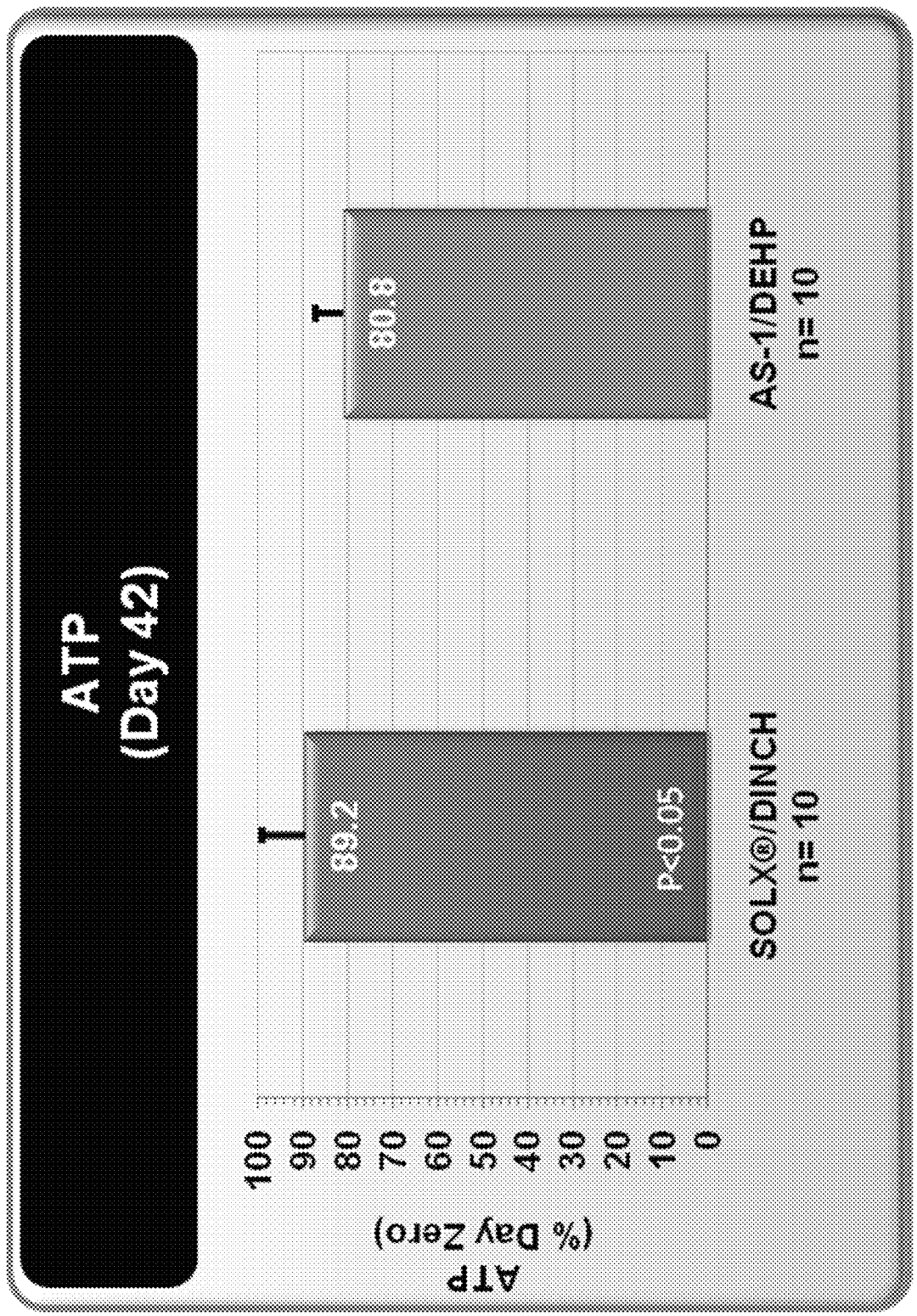
Figure 5: Higher maintenance of ATP in SOLX/DINCH compared to AS-1/DEHP

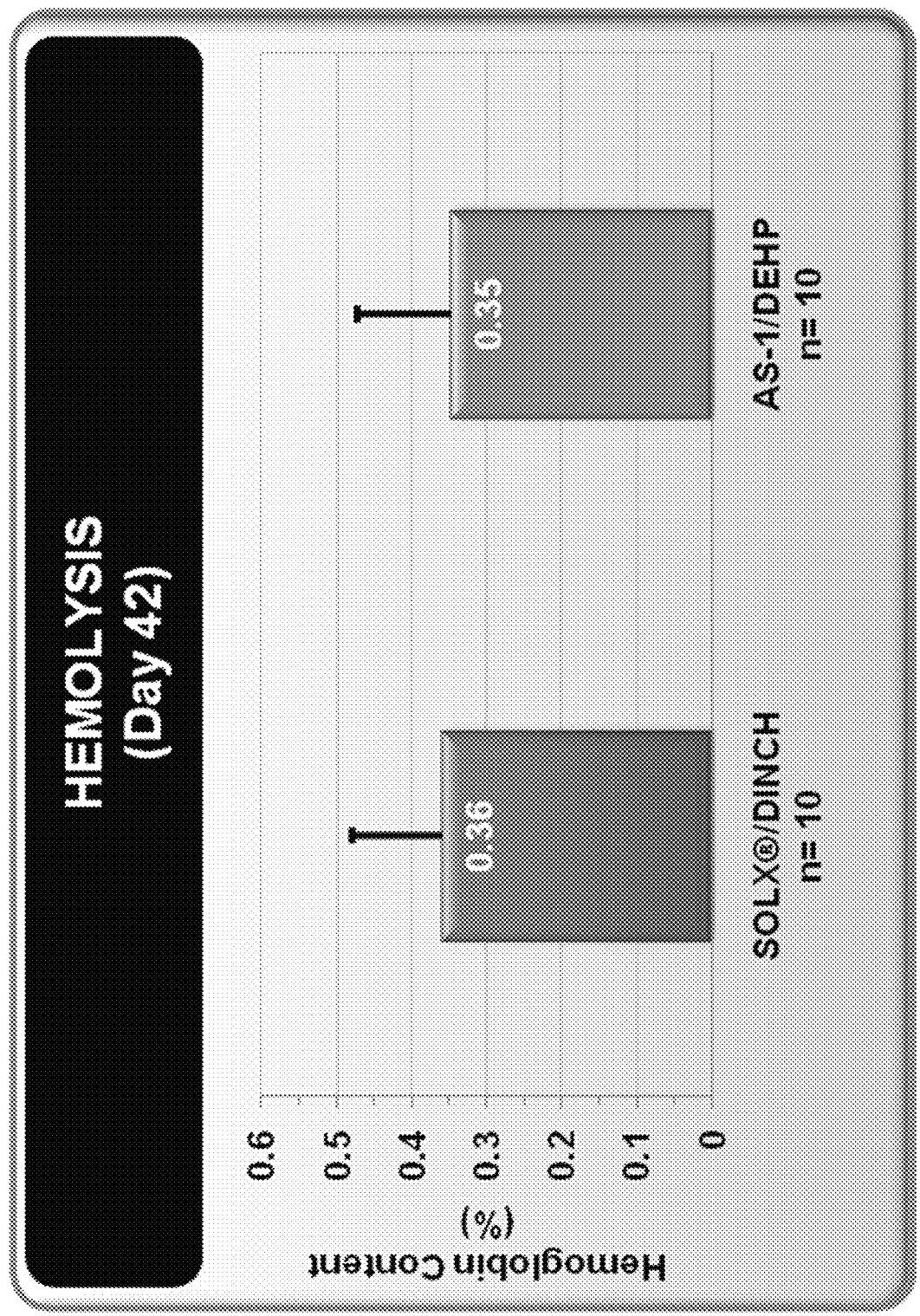
Figure 6A: No statistical difference in day 42 hemolysis

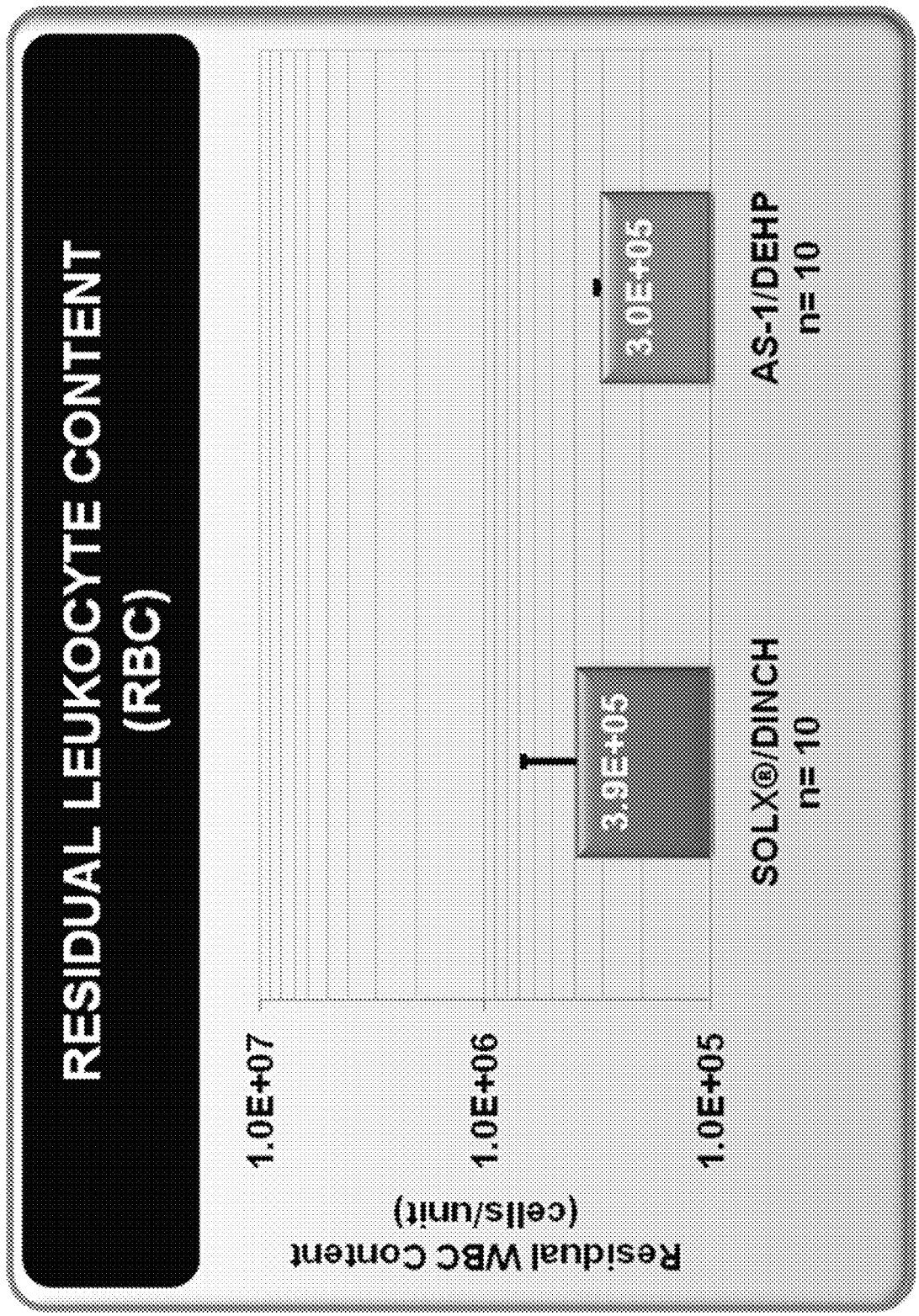
Figure 7: No statistical difference in residual white blood cell (WBC) count

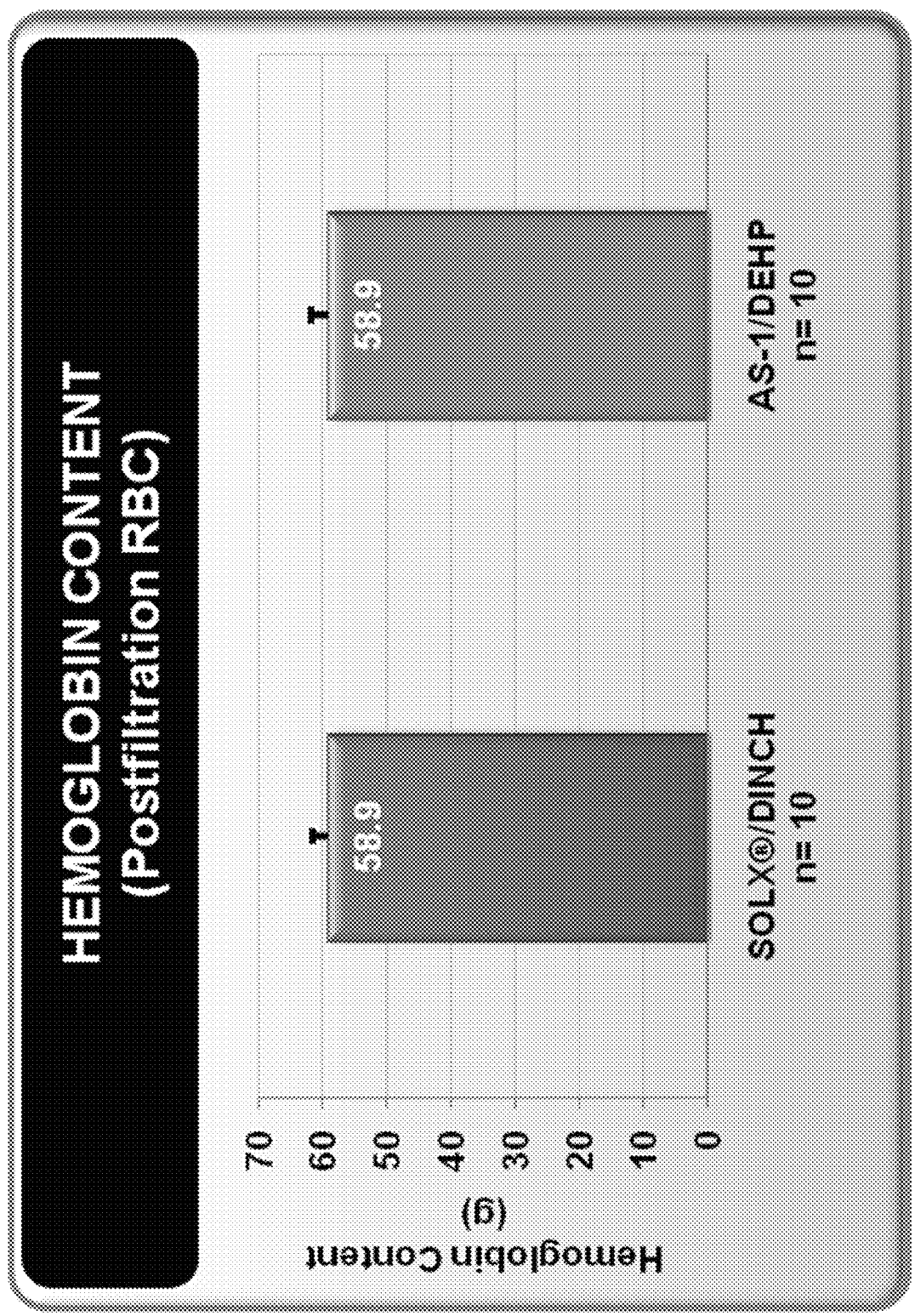
Figure 8: No statistical difference in residual hemoglobin content

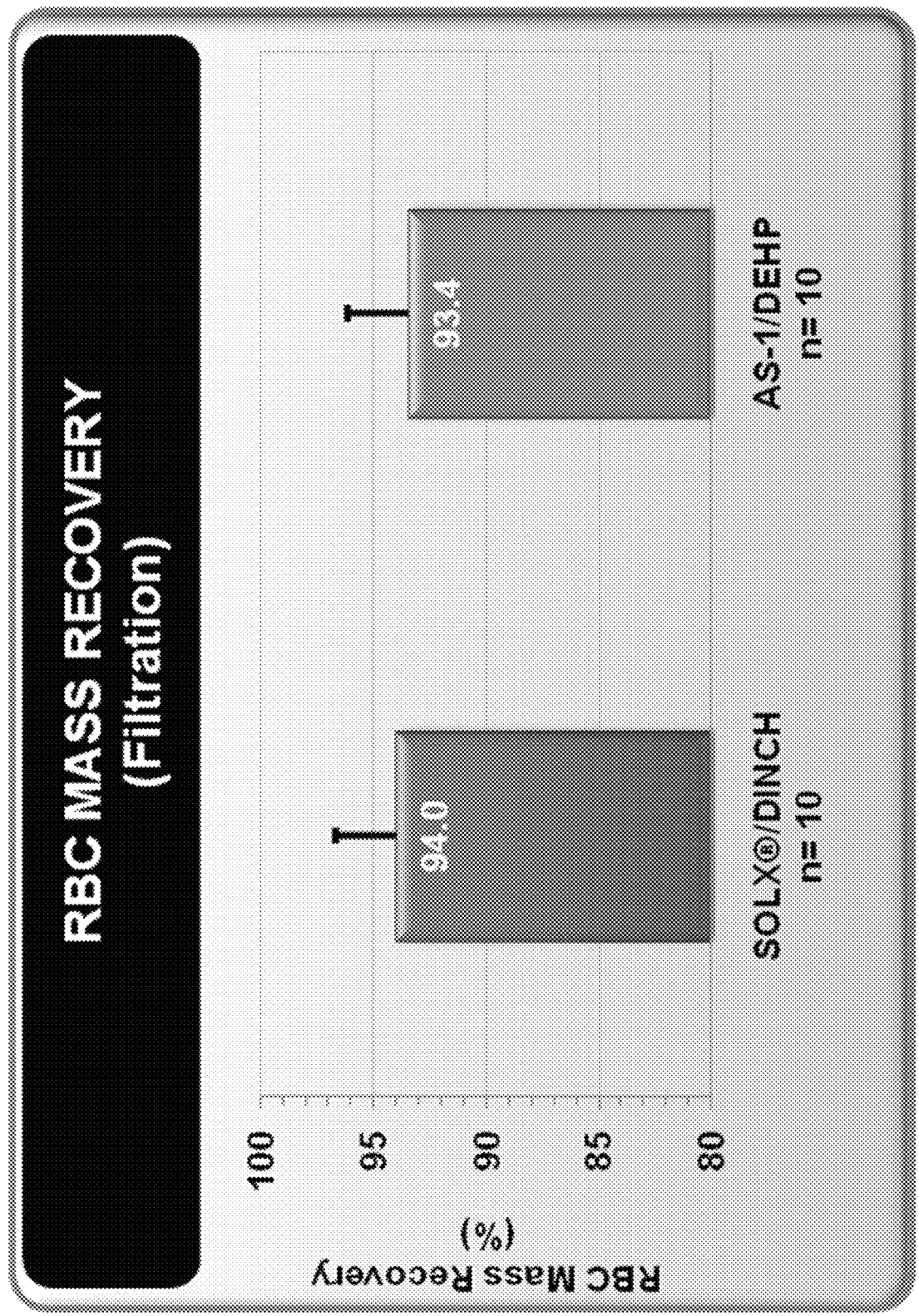
Figure 9: No statistical difference in filtration recovery

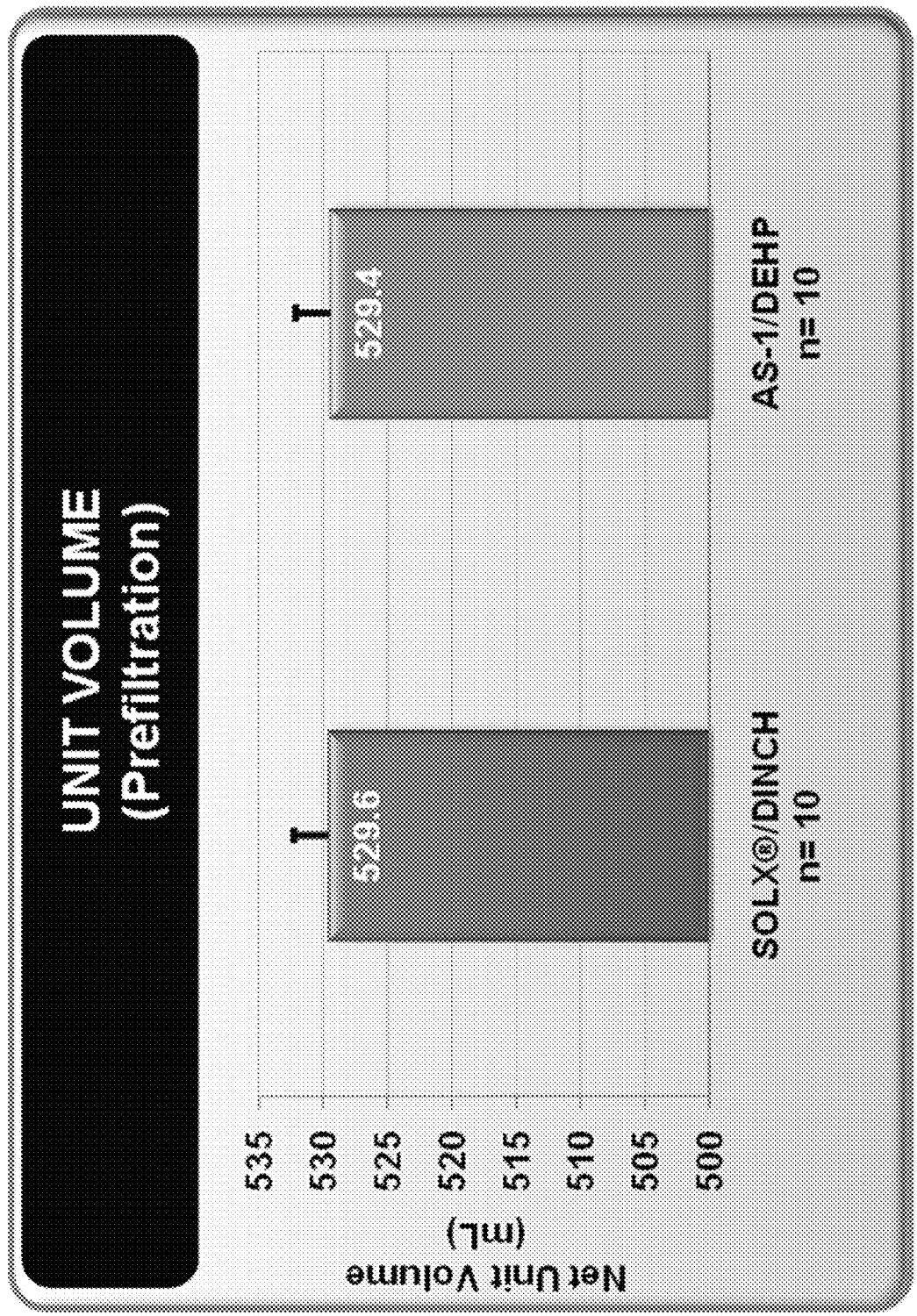
Figure 10: No statistical difference in prefiltration whole blood unit volume

BLOOD STORAGE CONTAINER CONTAINING AQUEOUS COMPOSITION FOR THE STORAGE OF RED BLOOD CELLS

PRIORITY

This patent application is a divisional application of U.S. patent application Ser. No. 14/422,735 filed Feb. 20, 2015 (now U.S. Pat. No. 11,730,676), which itself is a US national stage entry of PCT/US2013/056190 filed Aug. 22, 2013, which itself claims priority from U.S. Provisional Patent Application Ser. No. 61/692,048, filed Aug. 22, 2012, entitled, "Non-DEHP Blood Storage Bag Containing Aqueous Composition for the Storage of Packed Red Blood Cells," and naming Majid Zia as inventor, the disclosures of each of which is incorporated herein, in their entireties, by reference.

BACKGROUND OF THE DISCLOSURE

The present invention relates to compositions and methods associated with the storage of red blood cells (RBCs). In particular, it relates to an improved RBC storage composition in combination with a blood storage container.

Red blood cells are often separated from other components of whole blood from donors (e.g., platelets, white blood cells, and plasma) and are collected for later transfusion to a patient in need of red blood cells. For example, red blood cells (hereinafter "RBCs") may be administered to a patient suffering from a loss of blood due to trauma, as a post-chemotherapy treatment or surgery, or as part of a treatment of one or more blood borne diseases, such as certain anemias and the like. Unless administered immediately after collection from a donor, RBCs must typically be stored for some period of time prior to transfusion. The storage period may be anywhere from a few days to several weeks.

Prolonged storage of RBCs can (negatively) affect RBC function. In order for the RBCs to be suitable for transfusion to the recipient, RBCs must maintain adequate cell function and metabolism. For example, RBCs must maintain an adequate concentration of adenosine triphosphate (ATP). In addition, stored RBCs must have acceptably low levels of hemolysis. Typically, an acceptable level of hemolysis is below 1.0% (in, for example, the U.S. with 95% confidence and 95% reliability) and below 0.8% (in Europe with 90% of the tested units) after 42 day storage.

The ability to store and preserve red blood cells (RBCs) for later re-infusion into patients is a relatively recent technological development that was the harbinger to modern surgical practice. Such preservation is scientifically tricky and the steps to achieving longer storage duration and higher quality re-infused red blood cells have been incremental. As soon as they are collected from a donor, red blood cells begin to die as they coagulate, starve, lose ATP, 2,3-DPG, membrane surface area and integrity, and hemoglobin (Hb). Rous & Turner in 1916 and Robertson in 1917 15 first demonstrated successful whole blood storage. Acid-citrate-dextrose (ACD, 1943), comprising citrate as an anti-coagulant and dextrose as the sole nutrient utilized by red blood cells, and Citrate-phosphate-dextrose solution (CPD, 1957), adding phosphate as a metabolic source and for membrane retention, were subsequently approved for 21-day storage of whole blood. CPD with adenine (CPDA-1, 1979) was later introduced and used for extending the shelf life of stored whole blood and packed RBCs for up to 5 weeks.

Additive solutions for providing a storage environment for RBCs that will allow cell function and cell metabolism to be preserved and maintained have been developed and are commonly used. The additive solutions (i.e., media developed for RBCs) can prolong the storage life of RBCs for up to 42 days. These additive solutions often include a nutrient for the RBCs, a buffer to help maintain the pH of the RBCs, electrolytes, a RBC membrane-protecting compound and other additives to enhance and extend the life of the RBCs.

Traditionally, packed RBCs are stored in PVC bags. During manufacture, the PVC is mixed with a plasticizer so that the bags may be molded and/or welded into an appropriate shape. The PVC bags used in blood storage today are formulated with a plasticizer known as di-ethylhexyl phthalate (DEHP), up to 30-40% by weight. Because DEHP is not bound to the polymer in a PVC medical device, it is known to leach from the PVC into the storage solution at concentrations of up to 650 mg/liter and actually has been shown to have very beneficial effects in maintaining the viability and long-term storage of RBCs. The DEHP may actually bind to the RBCs, possibly preserving them and extending their shelf-life. DEHP's potential role in preserving red blood cells is an unintentional result: DEHP was not added to PVC to increase the shelf-life of blood cells, rather it was a serendipitous discovery.

However, DEHP may be toxic to humans. Studies in humans have found adverse health effects such as respiratory distress, cholestasis, and histological abnormalities of the liver. Animal studies have shown a wide range of toxic effects, especially to developing fetuses. Risks are higher in potentially sensitive groups, such as neonate and chronically ill individuals. High exposure patients include patients requiring extensive blood or blood product transfusions.

Thus, there is not only a need for prolonged storage of red blood cells, but also a need for long-term storage in non-DEHP containers. The desire to steer away from the use of DEHP in PVC used for medical devices is so great that European nations are actively regulating against its use.

Many alternative plasticizers have been proposed, but have certain shortcomings, such as prohibitive expense and lack of toxicology studies. More importantly, because the DEHP actually aids in the preservation of the stored RBCs, without DEHP, traditional storage solutions do not perform as well as with other plasticizers. In fact, the performance of one of the most commonly used storage solutions in bags without DEHP does not meet current regulatory standards for 42 days RBC storage. The main obstacle to approval of additive solutions in non-DEHP containers remains excess hemolysis observed with the use of non-DEHP containers. Thus, there is a critical need for new plasticizer/storage composition combinations that avoid the use of DEHP but yet can still perform within regulatory standards to maintain RBC quality for the current storage period.

SUMMARY OF THE EMBODIMENTS

Accordingly, the present invention provides a novel combination of blood storage container and aqueous composition suitable for the storage and preservation of collected red blood cells. In an attempt to find such a combination, the inventor surprisingly discovered aqueous composition combined in a non-DEHP containing container are suitable for storing and preserving collected red blood cells 1 to 6° C.

In one aspect, the invention provides a combination product for storing red blood cells, the product comprising, consisting essentially or, or consisting of a container comprising, consisting essentially of, or consisting of a wall defining an interior chamber wherein at least a portion of the wall is made of polymeric material combined with a non-phthalate plasticizer; and an aqueous composition contained within said chamber, said composition comprising, consisting essentially of, or consisting of adenine; dextrose; at least one non-metabolizable membrane-protectant sugar; and a pH buffering system, wherein the pH buffering system consists of a combination of physiologically acceptable buffering agents including at least one agent providing bicarbonate anions, at least one agent providing phosphate anions, and at least one agent providing sodium cations, wherein the aqueous composition is substantially free of exogenously derived chloride ions, wherein the pH buffering system is present in an amount sufficient for the composition to be operable to maintain a pH of a red blood cell (RBC) suspension to which the composition is added at a value sufficient to establish and maintain during a storage period a reaction equilibrium in the red blood cell that favors glycolysis over synthesis of 2,3-diphosphoglycerate (DPG) from 1,3-DPG, thereby generating a net gain in adenosine triphosphate (ATP) with respect to the reaction equilibrium during the storage period. In some embodiments, adenine is present in an amount of between about 1 mM and about 3 mM. In some embodiments, dextrose is present in an amount of between about 20 mM and about 115 mM. In some embodiments, the unmetabolizable membrane-protectant sugar is present in an amount of between about 15 mM and about 60 mM. In some embodiments, the at least one agent providing bicarbonate anions is sodium bicarbonate. In some embodiments, the at least one agent providing phosphate anions is disodium phosphate.

In another aspect, the invention provides a combination product for storing red blood cells, the product comprising, consisting essentially or, or consisting of a container comprising, consisting essentially of, or consisting of a wall defining an interior chamber wherein at least a portion of the wall is made of polymeric material combined with a non-phthalate plasticizer; and an aqueous composition contained within said chamber, said composition comprising, consisting essentially of, or consisting of adenine in an amount of about 1-3 mM, dextrose in an amount of from about 20 to about 115 mM, disodium phosphate in an amount of from about 4 to about 20 mM; at least one unmetabolizable membrane-protectant sugar in an amount of about 15 to about 60 mM, and a physiologically acceptable sodium salt at about 20 mM to about 130 mM. In various embodiments, the sodium acceptable salt is sodium bicarbonate. In some embodiments, the aqueous composition is substantially free of exogenously derived chloride ions.

In yet another aspect, the invention provides a combination product for storing red blood cells, the product comprising, consisting essentially or, or consisting of a container comprising, consisting essentially of, or consisting of a wall defining an interior chamber wherein at least a portion of the wall is made of polymeric material combined with a non-phthalate plasticizer; and an aqueous composition contained within said chamber, said composition comprising, consisting essentially of, or consisting of adenine in an amount of about 1-3 mM, dextrose in an amount of from about 20 to about 115 mM, unmetabolizable membrane-protectant sugar in an amount of about 15 to about 60 mM, sodium bicarbonate in an amount from about 20 to about 130 mM, and disodium phosphate in an amount of from about 4 to about 20 mM. In some embodiments, the aqueous composition is substantially free of exogenously derived chloride ions.

In various embodiments, the combination product provides benefits both in terms of the integrity and physiological functioning quality of the stored red blood cells with hemolysis levels required under regulatory law. The improved integrity and physiological functioning quality of the stored RBCs is expected when the stored RBCs are re-infused into the donor (or other patient in need of a transfusion).

In one specific embodiment, the non-DEHP plasticizer is diisononyl cyclohexane-1,2-dicarboxylate (DINCH). In some embodiments, the polymeric material comprises polyvinyl chloride. In some embodiments, the polymeric material comprises a non-PVC composition. In some embodiments, the non-phthalate plasticizer is 1,2-cyclohexane dicaroxylic acid diisononyl ester. In some embodiments, the non-phthalate plasticizer is non-DEHP plasticizer. In some embodiments, the non-phthalate plasticizer is butyl-n-tri-hexyl-citrate (BTHC); citrate ester acetyltri-nbutyl citrate (ATBC); di, (2, ethyl, hexyl) terephthalate (DENT); tri, (2-ethyl hexyl) trimellitate (TEHTM); or diisononyl cyclohexane-1,2-dicarboxylate (Hexamoll/DINCH).

In some embodiments, red blood cells stored in the product have a hemolysis level that is below 1.0% when the storage period at about 1 to 6° C. is at least 6 weeks. In some embodiments, red blood cells stored in the product have a hemolysis level that is below 1.0% when the storage period at about 1 to 6° C. is at least 8 weeks. In some embodiments, red blood cells stored in the product have a hemolysis level that is below 1.0% when the storage period at about 1 to 6° C. is at least 10 weeks. In some embodiments, red blood cells stored in the product have a hemolysis level that is below 1.0% when the storage period at about 1 to 6° C. is at least 12 weeks.

In some embodiments, the composition is substantially free of citrate.

In some embodiments, adenine is present in an amount of about 2 mM. In some embodiments, dextrose is present in an amount of between about 60 mM to about 100 mM. In some embodiments, dextrose is present in an amount of about 80 mM. In some embodiments, the unmetabolizable membrane-protectant sugar is present in an amount of between about 40 mM and about 60 mM. In some embodiments, the unmetabolizable membrane-protectant sugar is present in an amount of about 55 mM. In some embodiments, the unmetabolizable membrane-protectant sugar is mannitol.

In some embodiments, wherein the sodium bicarbonate is present in an amount of between about 20 mM and about 130 mM or between about 20 mM and about 40 mM. In some embodiments, the sodium bicarbonate is present in an amount of about 26 mM. In some embodiments, the disodium phosphate is present in an amount of between about 4 mM and about 20 mM or between about 7 mM and about 15 mM. In some embodiments, the disodium phosphate is present in an amount of about 12 mM.

In some embodiments, the osmolarity of the composition is between about 210 mOsmoles/liter and about 340 mOsmoles/liter. In some embodiments, the osmolarity of the composition is between about 220 mOsmoles/liter and about 310 mOsmoles/liter.

In some embodiments, the aqueous composition comprises, consists essentially of, or consists of adenine in an amount of about 2 mM, dextrose in an amount of about 80 mM, unmetabolizable membrane-protectant sugar in an amount of about 55 mM, sodium bicarbonate in an amount of about 26 mM, and disodium phosphate in an amount of about 12 mM, and that provides benefits both in terms of the integrity and physiological functioning quality of the stored and hemolysis levels required under regulatory law for licensing, even when used in combination with a non-DEHP plasticizer-containing PVC blood storage. The improved integrity and physiological functioning quality of the stored RBCs is expected when the stored RBCs are re-infused into the donor (or other patient in need of a transfusion). In one specific embodiment, the non-DEHP plasticizer is diisononyl cyclohexane-1,2-dicarboxylate (DINCH).

Also provided are methods for the storage of RBCs using the combination of non-DEHP blood storage solutions and the experimental composition. The method of preserving red blood cells (RBCs) for a storage period comprises; (a) collecting a sample of whole blood containing the RBCs to be stored and plasma in a blood storage container, wherein the blood storage container comprises either PVC or a non-PVC polymeric material and a non-phthalate or a non-DEHP plasticizer, (b) mixing the sample of collected whole blood with an anticoagulant solution (e.g., CPD), thereby forming a suspension of collected whole blood; (c) treating the suspension of collected whole blood to deplete the plasma and concentrate the RBCs, thereby forming packed RBCs (either with or without reducing the leukocyte content of the whole blood or the red blood cells); (d) mixing the packed RBCs with an amount of an aqueous composition sufficient to form a suspension of RBCs having about 35% to about 80% RBCs by volume; (e) cooling the suspension of RBCs to about 1 to about 6° C.; and (f) storing the cooled suspension of RBCs according to standard blood bank procedures.

In some embodiments, the RBCs are stored for 6 weeks (i.e., 42 days), or stored for 8 weeks (i.e., 56 days), or stored for 10 weeks (i.e., 70 days), or stored for 12 weeks (i.e., 84 days). In some embodiments, the aqueous composition comprises, consists essentially of, or consists of adenine in an amount of about 1-3 mM, dextrose in an amount of from about 20 to about 115 mM, unmetabolizable membrane-protectant sugar in an amount of about 15 to about 60 mM, sodium bicarbonate in an amount from about 20 to about 130 mM, and disodium phosphate in an amount of from about 4 to about 20 mM. In some embodiments, the aqueous composition comprises, consists essentially of, or consists of adenine; dextrose; at least one non-metabolizable membrane-protectant sugar; and a pH buffering system, wherein the pH buffering system consists of a combination of physiologically acceptable buffering agents including at least one agent providing bicarbonate anions, at least one agent providing phosphate anions, and at least one agent providing sodium cations, wherein the aqueous composition is substantially free of exogenously derived chloride ions, wherein the pH buffering system is present in an amount sufficient for the composition to be operable to maintain a pH of a red blood cell (RBC) suspension to which the composition is added at a value sufficient to establish and maintain during a storage period a reaction equilibrium in the red blood cell that favors glycolysis over synthesis of 2,3-diphosphoglycerat (DPG) from 1,3-DPG, thereby generating a net gain in adenosine tri phosphate (ATP) with respect to the reaction equilibrium during the storage period.

In some embodiments, steps (a)-(c) of the above method are modified by collecting the whole blood into CPD (e.g., 142 mM dextrose, 104 mM Na3 Citrate, 18 mM NaH2P04) or CP2D (e.g., 284 mM dextrose, 104 mM Na3 Citrate, 18 mM NaH2P04) and then leukoreducing the whole blood (e.g., by passage through a filter or centrifuging) to obtain leukoreduced whole blood. The leukoreduced whole blood is then centrifuged to separate plasma from the packed red blood cells. The packed red blood cells are mixed with the aqueous composition in the blood storage container comprises PVC and a non-DEHP plasticizer and stored at about 1 to about 6° C. according to standard blood bank procedures. In some embodiments, the RBCs are stored for 6 weeks (i.e., 42 days), or stored for 8 weeks (i.e., 56 days), or stored for 10 weeks (i.e., 70 days), or stored for 12 weeks (i.e., 84 days).

In some embodiments, whole blood is collected in anticoagulant (e.g., CPD, CP2D, or ACD), spun in a centrifuge and/or separated into various components including red blood cells which are collected into additive solution (e.g., comprising, consisting essentially of, or consisting of adenine; dextrose; at least one non-metabolizable membrane-protectant sugar; and a pH buffering system, wherein the pH buffering system consists of a combination of physiologically acceptable buffering agents including at least one agent providing bicarbonate anions, at least one agent providing phosphate anions, and at least one agent providing sodium cations, wherein the aqueous composition optionally is substantially free of exogenously derived chloride ions). Red blood cell in additive solution is leukocyte reduced and stored for the storage period.

In some embodiment, additive solution (e.g., comprising, consisting essentially of, or consisting of adenine; dextrose; at least one non-metabolizable membrane-protectant sugar; and a pH buffering system, wherein the pH buffering system consists of a combination of physiologically acceptable buffering agents including at least one agent providing bicarbonate anions, at least one agent providing phosphate anions, and at least one agent providing sodium cations, wherein the aqueous composition is substantially free of exogenously derived chloride ions) is added to anticoagulated blood collected via erythrocytapheresis and stored at 1 to 6 C.

These and additional embodiments and aspects of the present invention will be more fully appreciated by reference to the brief description of the figures, detailed description of the preferred embodiments and examples provided below.

BRIEF DESCRIPTION OF THE DRAWINGS

The foregoing features of embodiments will be more readily understood by reference to the following detailed description, taken with reference to the accompanying drawings, in which:

FIG. 1 is a graphical depiction of paired outcomes at day 42 of storage of red blood cells in AS-5 (Optisol) additive solution. Part A shows mixed (Yes—on right) and non-mixed (No-on left) RBCs stored in DINCH-PVC containers for percent hemolysis, extracellular potassium, and ATP (umol/g-Hb). Part B shows unmixed RBCs stored in DEHP-PVC containers (left) compared with mixed RBCs (weekly mixed) stored in DINCH-PVC containers (right). Data from Dr. Larry Dumont presented at American Society of Haematology 2009, poster presentation.

FIG. 2 is a graphical depiction of standardized mean hemolysis ratios of red blood cells stored in a storage composition consisting essentially of adenine in an amount of about 1-3 mM, dextrose in an amount of from about 20 to about 115 mM, unmetabolizable membrane-protectant sugar in an amount of about 15 to about 60 mM, sodium bicarbonate in an amount from about 20 to about 130 mM, and disodium phosphate in an amount of from about 4 to about 20 mM for 42 days, stored in either DEHP, DINCH, or BTHC bags as compared to red blood cells stored in DEHP bags at 5, 6, 7, 8, or 9 weeks of storage. As these are ratios of compared to the DEHP bags, the DEHP bag (black bars) is 1.0. The middle medium gray bar is the DINCH bag while the right light gray bar is the BTHC bag.

FIG. 3 is a bar graph showing the morphology scores of RBCs stored for 42 days stored in the AS-7 solution in DINCH containers or AS-1 in DEHP containers.

FIG. 4 is a bar graph showing the microvesicle protein level of RBCs stored for 43 days stored in the experimental composition in DINCH containers or AS-1 in DEHP containers.

FIG. 5 is a bar graph showing the level of ATP (expressed as a percent of initial ATP level) of RBCs stored for 42 days stored in the experimental composition in DINCH containers or AS-1 in DEHP containers.

FIGS. 6A and 6B are a bar graph and a line graph, respectively, showing the amount of hemolysis (measured as percent hemoglobin content) of RBCs stored for 42 days stored in the experimental composition in DINCH containers or AS-1 in DEHP containers. FIG. 6A shows the mean of the ten pools, FIG. 6B shows the individual pools.

FIG. 7 is a bar graph showing the residual white blood cell (WBC) count of RBC units in SOLX in DINCH containers or in AS-1 in DEHP containers that will be stored (this is at day 0).

FIG. 8 is a bar graph showing the residual hemoglobin content of RBCs post filtration (i.e., filtration to reduce white blood cells) in SOLX in DINCH containers or in AS-1 in DEHP containers that will be stored (this is at day 0).

FIG. 9 is a bar graph showing the ratio of the post-filtration of RBC mass divided by pre-filtration RBC mass of whole blood units that will be processed into packed RBCs and then stored in SOLX/DI CH containers or in AS-1 in DEHP containers. The filtration removes (by trapping) white blood cells and also traps some red blood cells.

FIG. 10 is a bar graph showing the unit volume of whole blood units in CPD pre-filtration (i.e., prior to filtration), RBCs of which will either be stored in SOLX/DINCH containers or in AS-1 in DEHP containers.

DETAILED DESCRIPTION OF SPECIFIC EMBODIMENTS

Figure 6B:
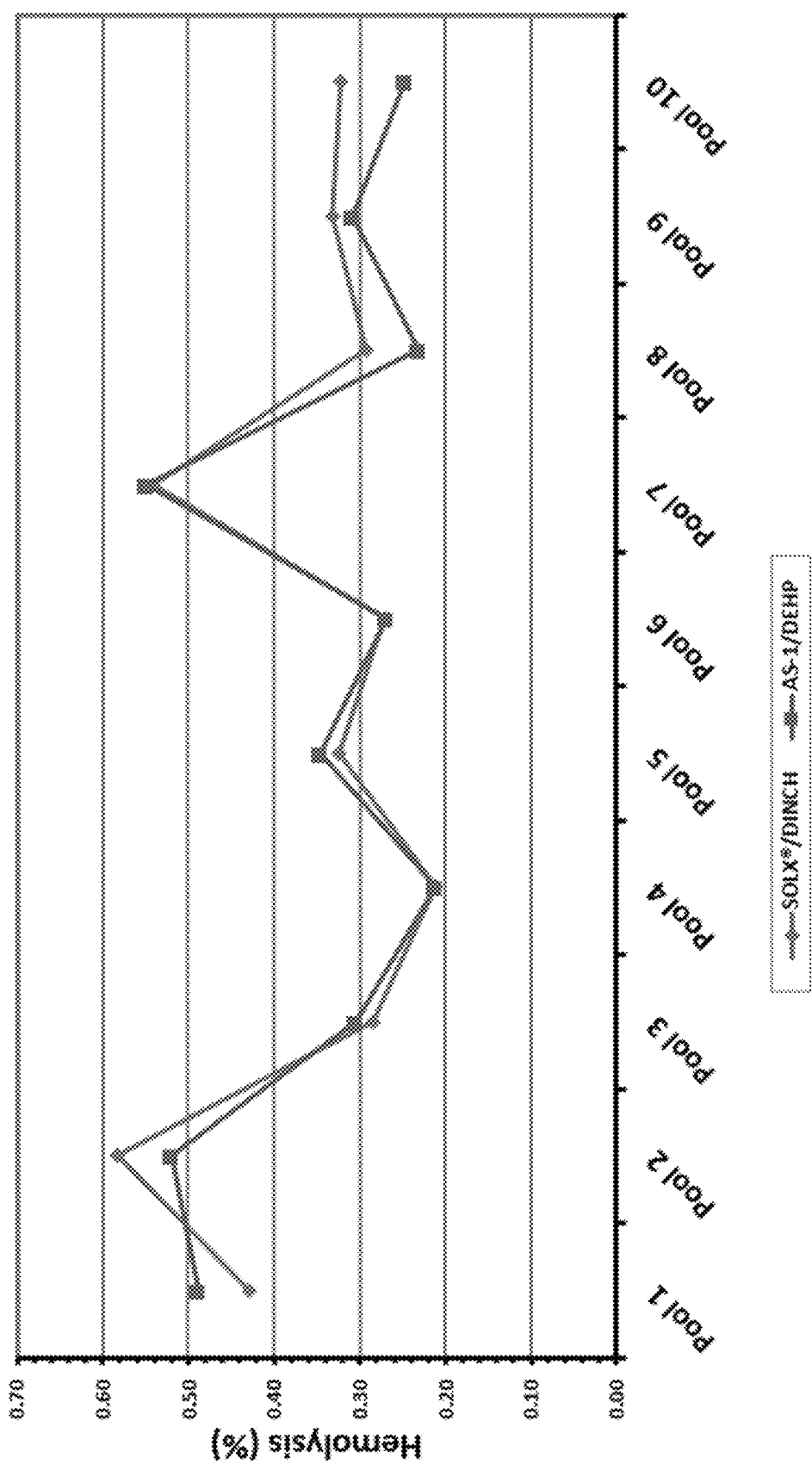

The present invention is based upon the development of a combination red blood cell additive solution and storage bag lacking DEHP plasticizer. The invention generally relates to compositions and methods associated with the storage of red blood cells (RBC). In particular, it relates to the combination of aqueous compositions for the storage of red blood cells in non-DEHP blood storage bags and related methods for the storage of red blood cells. In some embodiments, the red blood cells that have been separated from whole blood collected in citrate phosphate dextrose (CPD) solution, its variant, citrate phosphate double dextrose (CP2D) solution, or by aphaeresis (removal of whole blood from a patient or donor) in acid citrate dextrose (ACD formula A with 7.3 g/L citric acid, 24.5 g/L dextrose monohydrate, and 22 g/L sodium citrate dihydrate or ACD formula B with 4.4 g/L citric acid, 14.7 g/L dextrose monohydrate, and 13.2 g/L sodium citrate dihydrate) or similar solutions.

The published patents, patent applications, websites, company names, and scientific literature referred to herein establish the knowledge that is available to those with skill in the art and are hereby incorporated by reference in their entirety to the same extent as if each was specifically and individually indicated to be incorporated by reference. Any conflict between any reference cited herein and the specific teachings of this specification shall be resolved in favor of the latter.

Definitions. As used in this description and the accompanying claims, the following terms shall have the meanings indicated, unless the context otherwise requires:

For purposes of this disclosure, the term "in vivo recovery" is used herein to indicate the fraction of stored RBCs that remains in circulation for 24 hours, after re-infusion into the original human donor.

The term "non-DEHP" means a plasticizer that is not di-ethylhexyl phthalate (DEHP) but is a plasticizer other than di-ethylhexyl phthalate (DEHP). In some embodiments, a non-DEHP plasticizer is a non-phthalate plasticizer (i.e., is not a phthalate plasticizer). In some embodiments, the non-DEHP plasticizer is not di(2-ethylhexyl) phthalate (DEHP), is not the diisodecyl phthalate (DIDP), is not diisononyl phthalate (DINP), and/or is not di-(2-propyl heptyl) Phthalate (Palitinol 10-P). A non-limiting non-DEHP plasticizer may be (but is not limited to) any one, or combination of the following: butyl-n-trihexyl-citrate (BTHC); trimellitates; citrates such as citrate ester acetyltri-nbutyl citrate (ATBC); di, (2, ethyl, hexyl) terephthalate (DENT) (also known as Dioctyl terephthalate (bis(2-ethylhexyl) benzene-1,4-dicarboxylate, or DOTP); tri, (2-ethyl hexyl) trimellitate (TEHTM); and diisononyl cyclohexane-1,2-dicarboxylate (Hexamoll®/DINCH®, both registered trademarks owned by BASF). Note that another name for DINCH is 1,2-cyclohexane dicarboxylic acid diisononyl ester.

The term "regulatory requirements" or "regulatory standards" means the current requirements for approval for aqueous compositions for storage of red blood cells in a given jurisdiction. In the United States, the regulatory requirements are described in Title 21 of the U.S. Code of Federal Regulations (e.g., Sections 606, 630, 640, 660, etc.) and in the regulations set forth by the U.S. Food and Drug Administration FDA/CBER summary basis of approvals for RBC additive solutions, an example of which is hereby incorporated by reference. In Europe, the equivalent is described in the document entitled, "Guide to the preparation, use and quality assurance of blood components" by the Council of Europe. All of these regulations are hereby incorporated by reference. Other countries and communities (e.g., Canada and Japan) have equivalent regulations. One measure of performance of an aqueous solution for the storage of red blood cells is hemolysis, where the RBCs at the end of their storage life should have <1% hemolysis (95% confidence that at least 95% of the population estimate will be less than 1%) in the U.S., and 90% of units should be <0.8% hemolysis in EU member states. Another measure of performance is the in vivo recovery rates. The standard in the U.S. is that mean 24 hour, post transfusion, in vivo red cell recovery at end of storage of at least 75% with standard deviation of at most 9%, and the lower limit of a one-sided 95% confidence interval for the population proportion of successes is 70% or greater, and in Europe is achieving a mean 24 hours post-transfusion in vivo recovery of no less than 75% of the transfused red blood cells.

The term "standard blood banking procedure" means the currently used methods for the preparation of packed RBCs and subsequent storage. Such methods are well known by those skilled in the art and are described in Title 21 of the U.S. Code of Federal Regulations, in the guidance entitled "Changes to an Approved Application: Biological Products—Human Blood and Blood Components Intended for Transfusion of for Further Manufacture," dated July 2001, and the new draft guidelines of the same title announced by the U.S. Food and Drug Administration on May 31, 2013; and in the "Technical Manual" and "Circular of Information for the Use of Human Blood and Blood Components" by the American Association of Blood Banks and Instruction for Use and by manufacturers of blood collection systems, which are hereby incorporated by reference to the extent permitted by law. Specifically, standard blood banking procedure does not traditionally involve periodic mixing of the RBCs units during storage, mainly due to the time and expense of ensuring the mixing is done in a proper and timely manner.

As used herein, "chloride" refers to anionic chloride. Thus, the term "chloride" includes anionic chloride and the salt forms thereof, such as may be formed from chloride anion(s) and physiologically-acceptable cation(s). The term "chloride" is not intended to include compounds wherein the chloride atom is covalently bonded to, for example, a carbon atom covalently bonded to a chloride atom in an organic molecule.

As used herein, the phrase "physiologically-acceptable buffering agent" refers to buffering agents which yield cations and anions either normally found in the blood, plasma, or serum of a human, or that may be tolerated when introduced into a human. Suitable cations include protons, ammonium cations and metal cations. Suitable metal cations include, but are not limited to, the cationic forms of sodium, potassium, calcium, and magnesium, where sodium and potassium are preferred, and sodium is more preferred. An ammonium cation, i.e., a compound of the formula $R4N^+$ where R is hydrogen or an organic group, may be used so long as it is physiologically acceptable. In a preferred embodiment, the cation is selected from hydrogen (i.e., proton), sodium, potassium, calcium, magnesium, and combinations thereof. As used herein, "buffering agent" refers to an agent that adjusts and regulates the pH of a composition.

The additive solutions or compositions for the storage of RBCs described herein are aqueous, that is, they are formulated in water. A preferred water of the invention is treated in order that it is essentially pyrogen-free and sterile.

As used herein, "mEq/L" refers to the concentration of a particular component (solute) present in proportion to the amount of water present. More specifically, mEq/L refers to the number of milli-equivalents of solute per liter of water. Milli-equivalents per liter are calculated by multiplying the moles per liter of solute by the number of charged species (groups) per molecule of solute, which is then multiplied by a factor of 1,000.

One embodiment of the present invention provides a non-DEHP storage bag and an aqueous composition for storage of red blood cells at about 1 to about 6° C. The composition consists essentially of: adenine; dextrose; at least one non-metabolizable membrane-protectant sugar; and a pH buffering system. The pH buffering system comprises a combination of physiologically acceptable buffering agents and must include at least one agent that provides bicarbonate anions, at least one agent that provides phosphate anions, and at least one agent that provides sodium cations. The invention contemplates that a single buffering salt may satisfy more than one of these requirements. In some embodiments, the composition does not contain NaCl. In some embodiments, the composition does not contain chloride.

Storage solutions for red blood cells have been developed before. Initially, storage compositions were designed to be acidic to prevent the caramelization of the glucose during the heat sterilization performed in the final production step. In the 1950s, adenine was discovered to be useful as an additive and replaces the adenine lost by deamination. In the 1970s it became desirable to remove the plasma from the collected whole blood for platelets and for the manufacture of plasma derivatives. This, however, led to a reduction in the percent in vivo RBC recovery/survival of the resulting packed RBC.

By "packed red blood cells" or "packed RBC" is simply meant a concentration of the red blood cell component of whole blood, whether that whole blood is in a donated whole blood unit, or whether that whole blood is circulating in a donor. For example, from a unit of whole blood, packed RBC is simply the red blood cells in the whole blood concentrated in percentage while removing other non-RBC components of the whole blood (e.g., platelets, white blood cells, plasma, etc.). In some embodiments, the packed red blood cells may be in the presence of an anticoagulant (e.g., CPD, CP2D, or ACD). The packed RBC component does not require the inclusion of every red blood cell in the whole blood, and it will be understood that to remove non-RBC components from the whole blood (e.g., by filtration or centrifugation), some red blood cells may be removed as well. However, the resulting packed red blood cells will have a higher concentration of red blood cells as compared to other whole blood components (e.g., in a smaller volume). Any method to concentrate red blood cells can be used to obtain packed red blood cells including, without limitation, centrifugation, filtration (e.g., filtration to reduce the white blood cell counts), or any other form of separation (e.g., erythrocytapheresis). It is to this packed RBCs that the additive solution is added, forming a suspension of red blood cells in additive solution.

To circumvent this, compositions known in the art as additive solutions (AS) were developed to restore volume, nutrients, and other useful RBC stabilizers. Additive solution compositions for the preservation of red blood cells (RBCs) after their separation from whole blood are intended to be tailored specifically to the needs of RBCs. The development of certain additive solutions extended RBC storage to 6 weeks in 1981. Red blood cells (RBCs) stored in these solutions, however, undergo steady deterioration after about 6 weeks as determined by the inability of 75% of such cells to survive in the circulation for 24 hours after re-infusion back into the human donor. It has been observed that during continued refrigerated storage, glucose is consumed at a decreasing rate, as the concentration of metabolic waste, i.e., lactic acid and hydrogen ions, increases. Such a decrease in the rate of glucose metabolism leads to depletion of adenosine triphosphate (ATP), which directly correlates to the recovery of RBCs when the cells are returned to the circulation. Additive solutions such as Adsol® (AS-1), Nutricel® (AS-3), Optisol® (AS-5), and ErythroSol RIM were designed to extend the storage of RBCs at 1-6° C. All three Additive Solutions (ASs) currently licensed in the U.S., AS-1, AS-3, and AS-5, contain saline, adenine, glucose and some citrate and/or mannitol as "membrane protectants." AS-3 also contains monosodium phosphate.

Tables 1 and 2 show the formulas of various additive solutions that can be used in the combination products and methods described herein.

TABLE 1

Compositions of Additive Solution Compositions (components in mM)

| | AS-3 | EAS-61 | EAS-64 | EAS-76v6 | EAS-81/AS-7/SOLX® |
|---|---|---|---|---|---|
| NaCl | 70 | 26 | 75 | 30 | |
| NaHCO3 | | | | 30 | 26 |
| NaH2PO4 | 23 | | | | |
| Na2HPO4 | | 12 | 9 | 9 | 12 |
| Adenine | 2 | 2 | 2 | 2 | 2 |
| Na3Citrate | 18 | | | | |
| Dextrose | 55 | 110 | 50 | 50 | 80 |
| Mannitol | | 55 | 20 | 30 | 55 |

TABLE 2

| Additives (mM) | AS-1 | AS-3 | AS-5 | PAGGM | SOLX® |
|---|---|---|---|---|---|
| Dextrose | 111 | 55.5 | 45 | 52 | 80 |
| Guanosine | | | | 1.5 | |
| Na3Citrate | | 20 | | | |
| NaH2PO4 | | 23 | | | |
| Na2HPO4 | | | | 32 | 12 |
| Adenine | 2 | 2.2 | 2.2 | 2 | 2 |
| NaCl | 154 | 70.1 | 150 | 72 | |
| Mannitol | 41 | | 45.4 | 55 | 55 |
| Citric Acid | | 12 | | | |
| NaHCO3 | | | | | 26 |

In some embodiments, the pH of AS-3, prior to addition of the red blood cells, is 5.8. In some embodiments, the pH of EAS-61, prior to addition of the red blood cells, is 8.3. In some embodiments, the pH of EAS-76v6, prior to addition of the red blood cells, is 8.4. In some embodiments, the pH of EAS-81, prior to addition of the red blood cells, is 8.5.

Each of the U. S.-licensed ASs meet the licensure requirements for 6-week RBC storage, but fail to achieve 7-week storage. Presently licensed RBC additive solution compositions were developed before the RBC storage lesion (defined herein as the sum of the survival- and/or function-limiting effects of storage on RBCs) was understood to be an apoptotic process.

Almost all of the whole blood collected now is made into components, and the RBC fraction is stored as packed RBCs. For blood drawn into the additive solution systems, Whole blood is drawn into anticoagulant (e.g., CPD, CP2D), RBCs are packed by centrifugation, plasma is removed so that RBCs make up approximately 80% of the volume, and then 100 ml or 110 mL of additive solution is added sterilely for 450 mL or 500 mL whole blood collection, respectively. The resulting suspensions have a RBC volume fraction of approximately 55%. RBCs stored in the conventional FDA-approved additive solutions can be stored for only 6 weeks with an acceptable 24-hour in vivo recovery.

To increase the time of acceptable in vivo recovery of RBCs re-infused into patients after a storage period, attempts have been made to improve the additive solutions and storage processes. In "Studies In Red Blood Cell Preservation-7. In vivo and in vitro Studies With A Modified Phosphate-Ammonium Additive Solution," by Greenwalt et al, Vox. Sang. 65:87-94 (1993), the authors determined that an experimental additive solution (designated EAS-2) containing (in mM): 20 NH4Cl, 30 $Na_2HPO_4$, 2 adenine, 110 dextrose, 55 mannitol, formulated at a pH of 7.15, is useful in extending the storage shelf-life of human RBCs from the current standard of 5-6 weeks to an improved standard of 8-9 weeks.

In "Studies in Red Blood Cell Preservation-8; Liquid Storage of Red Cells in Glycerol-Containing Additive Solution," Vox. Sang. 67: 139-143 (1994), Greenwalt et al. described an additive solution (designated EAS-25) that allowed 73 percent in vivo recovery of packed red cells after nine weeks.

In "Extending the Storage of Red Cells at 4.degree. C.," Transfus. Sci. 15: 105-115 (1994) by Meryman et al, acceptable viability of RBCs stored in very dilute suspensions at low hematocrit for as long as 27 weeks were demonstrated.

With respect to approved and commercially available products, the additive solutions presently licensed in the U.S. work for only about 6 weeks with an average recovery of about 80%. Two additive solutions presently licensed in Europe work for about 7 weeks with an average in vivo recoveries of 77% (ErythroSol from Baxter Healthcare, La Chatre, France) and 75% (PAGGS mannitol from Maco Pharma). Novel solutions recently described by Kurup et al. (Vox Sang 2003: 85:253-261) may be expected to have shorter storage times because of the lower ATP concentrations.

In response to the deficiencies in these prior findings, Hess and Greenwalt developed lower volume disodium phosphate-containing alkaline experimental additive solutions (EASs) that partially neutralize the effect of collecting blood into acidic anticoagulant solutions such as CPD (citrate-phosphate-dextrose) or CP2D (citrate-phosphate-double-dextrose), and showed that these EASs improved RBC ATP concentrations, reduced hemolysis, and appeared to decrease RBC membrane morphological changes and loss (see U.S. Pat. Nos. 6,150,085 and 6,447,987 to Hess and Greenwalt, the complete disclosures of which are fully incorporated herein by reference). Various EASs were shown to support between 9 and 12 weeks of storage. Although these EASs yielded superior performance results, they contained sodium chloride and were formulated to require a relatively large volume resulting in greater dilution of the stored RBC, thus increasing the risk of hemodilution in multiply transfused patient recipients. In addition, the presence of sodium chloride created a solubility limit on the amount of buffering salts and phosphates that the system could sustain at desirable volumes.

Increased duration of RBC storage remains an important consideration during periods when demand is high but intermittent, such as during wartime, and for geographical regions that require transfusable blood but only on an inconsistent and sporadic basis. In fact, given the current level of reported waste due to expiration of the safe storage period prior to realization of a demand in general, increasing the duration of time that RBCs may be safely stored is an ongoing ubiquitous concern.

Thus, there is a need for RBC storage containers and RBC storage compositions formulated to retain and/or enhance recovery and performance benefits in the lower volumes of conventional additive solutions. There is a continuing need in the blood storage and transfusion art for improved RBC storage that results in longer storage duration, better in vivo recovery percentage, and improved physiological functioning of the transfused RBC. Consequently, there remains a need for improved RBC storage compositions and processes of manufacture thereof. There is also a continuing need for additive compositions which allow the RBC suspension to which the composition is added to be directly infused into humans, and which permit an acceptable post-infusion recoverability of viable RBCs possessing enhanced physiological functioning capabilities and lower rates of clearance from the infused patient's circulation.

A non-limiting aqueous composition for the storage of red blood cells is described in U.S. Patent Pub. No. U.S. 2005-0233302 A1 by Hess and Greenwalt, which is hereby incorporated by reference in its entirety. One embodiment of the invention described in the Hess and Greenwalt application was an aqueous composition for the storage of red blood cells wherein the aqueous composition consists essentially of adenine in an amount of about 1-3 mM, dextrose in an amount of from about 20 to about 115 mM, unmetabolizable membrane-protectant sugar in an amount of about 15 to about 60 mM, sodium bicarbonate in an amount from about 20 to about 130 mM, and disodium phosphate in an amount of from about 4 to about 20 mM. This particular embodiment allowed better in vivo recovery rates of RBCs stored for conventional 6 week storage periods, but also allowed for acceptable in vivo recovery rates of RBCs stored for longer periods. Thus, a superior storage composition had been formulated.

Examples of widely used and accepted storage media are Adsol® and SAG-M, both available from Fenwal, Inc., of Lake Zurich, Illinois.

Other additive solutions are disclosed in U.S. Patent Application Publication Nos. 2009/0239208 and 2011/0117647 both of which are incorporated by reference herein in their entireties.

In one embodiment, the non-DEHP plasticizer is DTNCH. In one embodiment, the composition consists essentially of adenine in an amount of about 1-3 mM, dextrose in an amount of from about 20 to about 115 mM, nonmetabolizable membrane-protectant sugar in an amount of about 15 to about 60 mM, sodium bicarbonate in an amount from about 20 to about 130 mM, and disodium phosphate in an amount of from about 4 to about 20 mM. In another embodiment the composition consists essentially of adenine in an amount of about 2 mM, dextrose in an amount of from about 60 to about 100 mM, nonmetabolizable membrane protectant sugar in an amount of about 40 to about 60 mM, sodium bicarbonate in an amount of from about 22 to about 40 mM, and disodium phosphate in an amount of from about 7 to about 15 mM, and in a still further embodiment the composition consists essentially of adenine in an amount of about 2 mM, dextrose in an amount of about 80 mM, nonmetabolizable membrane-protectant sugar in an amount of about 55 mM, sodium bicarbonate in an amount of about 26 mM, and disodium phosphate in an amount of about 12 mM, and further wherein the composition has a pH of about 8.5.

In a still further embodiment, the at least one nonmetabolizable membrane-protectant sugar is mannitol. In a still further embodiment, the at least one nonmetabolizable membrane-protectant sugar is a sugar alcohol, such as a monosaccharide-derived sugar alcohol. Some sugar alcohols, in particular the monosaccharide-derived sugar alcohols (e.g., sorbitol, mannitol, xylitol, erythritol), are small hydrophilic molecules that appear to diffuse readily through some lipid barriers and may play an important role in cellular stability. Mannitol, in particular, is a known antioxidant that acts as a hydroxyl radical scavenger in vivo. It appears to play a substantial role in the maintenance of cell membrane integrity and is considered a membrane-protectant sugar. Other small polyols may also function as membrane protectant sugars. It is significant to note that glucose and mannitol have the same mole weight, that is, 180 g/mole. Sugar alcohols are not metabolized by the red blood cell.

Still further embodiments provide that the aqueous compositions have an osmolarity of from about 200 to about 340 mOsM. In some embodiments the compositions have an osmolarity of from about 210 to about 310 mOsM. In some embodiments the compositions have an osmolarity of from about 221 to about 280 mOsM. In yet another embodiment the osmolarity is about 270 mOsM.

As noted, RBCs metabolize glucose (d-glucose="dextrose") to make ATP. The waste products are lactate and protons. The protons accumulate, driving down the pH and inhibiting further metabolism. Bicarbonate has been suggested as a buffer system wherein it combines with the protons and, in the presence of RBC carbonic anhydrase, is converted to water and carbon dioxide. In a storage container that permits diffusion of the carbon dioxide, the reverse reaction is prevented and the reaction is driven toward the formation of $CO_2$. A buffering system based on bicarbonate has considerable capacity. Bicarbonate in physiologic concentrations in the additive solution creates the $pCO_2$ in the solution that drives the diffusion of up to 1 to 2 mmol of $CO_2$ from an about 100 to about 800 mL capacity PVC bag (or from about 200 to about 700 mL capacity, or from about 400 to about 600 mL capacity PVC bag) each week. However, previous attempts to formulate RBC storage additive solutions with bicarbonate have failed with respect to increasing ATP synthesis and prolonging the effective storage period. For instance, Beutler (BAG-PM) described the addition of bicarbonate to RBC storage solutions, but failed to control for a high pH that led to rapid ATP depletion.

One preferred embodiment of the combination product provides that the aqueous compositions have a pH of from about 8 to about 10.5. In other embodiments the pH is from about 8.2 to about 10. In other embodiments the pH is from about 8.2 to about 9.5. In further embodiments, the pH of the composition is from about 8.4 to about 8.6, and in still further embodiments the pH of the composition is about 8.5. Another embodiment is directed to the inventive compositions wherein the buffering system has a buffering capacity in the red blood cell (RBC) suspension to which the composition is added which increases by at least about 2 mEq between a pH of 6.5 and 7.2 over a storage period of 6 weeks. The presently disclosed buffering system should provide a buffering capacity of at least this value, but is capable of providing even greater buffering capacities to the RBC suspension thereby lengthening the storage period even further.

The present invention also provides method embodiments. In one such embodiment a method of preserving red blood cells (RBCs) for a storage period is provided. The method comprises: (a) mixing a sample of collected whole blood containing the RBCs to be stored and plasma with an anticoagulant solution, thereby forming a suspension of collected whole blood; (b) treating the suspension of collected whole blood to deplete the plasma and concentrate the RBCs, thereby forming packed RBCs (either with or without reducing the leukocyte content of blood); (c) mixing the packed RBCs with an amount of an aqueous composition sufficient to form a suspension of RBCs having about 35% to about 80% RBCs by volume; (d) cooling the suspension of RBCs to about 1 to about 6° C.; and (e) storing the cooled suspension of RBCs according to standard bank procedures known in the art. consists essentially of adenine in an amount of about 1-3 mM, dextrose in an amount of from about 20 to about 115 mM, nonmetabolizable membrane-protectant sugar in an amount of about 15 to about 60 mM, sodium bicarbonate in an amount from about 20 to about 130 mM, and disodium phosphate in an amount of from about 4 to about 20 mM. The solution may be divided in manufacture to separate components of the solution into different compartments (e.g., during sterilization). For example, the dextrose may be separated from the phosphate, which may be separated from the sodium bicarbonate, which may be separated from the adenine, which may be separated from the nonmetabolizable membrane-protectant sugar. Of course, some components may be combined (e.g., the nonmetabolizable membrane-protectant sugar and dextrose may be together and the bicarbonate and adenine may be together.

Further provided are methods for storing packed RBCs in the composition of one preferred embodiment in non-DEHP-PVC storage containers. The method of preserving red blood cells (RBCs) for a storage period comprises: (a) collecting a sample of whole blood containing the RBCs to be stored and plasma in a blood storage container, wherein the blood storage container comprises PVC and a non-DEHP plasticizer, (b) mixing the sample of collected whole blood with an anticoagulant solution, thereby forming a suspension of collected whole blood; (c) treating the suspension of collected whole blood to deplete the plasma and concentrate the RBCs, thereby forming packed RBCs (either with or without reducing the leukocyte content of blood); (d) mixing the packed RBCs with an amount of an aqueous composition sufficient to form a suspension of RBCs having about 35% to about 80% RBCs by volume; (e) cooling the suspension of RBCs to about 1 to about 6° C.; and (f) storing the cooled suspension of RBCs according to standard blood bank procedures, wherein the aqueous composition consists essentially of adenine in an amount of about 1-3 mM, dextrose in an amount of from about 20 to about 115 mM, unmetabolizable membrane-protectant sugar in an amount of about 15 to about 60 mM, sodium bicarbonate in an amount from about 20 to about 130 mM, and disodium phosphate in an amount of from about 4 to about 20 mM.

Methods directed to the use of DINCH-PVC storage containers are also provided. Methods according to the present invention directed to specific ranges of the necessary ingredients of the composition are also provided. In one method embodiment the composition consists essentially of adenine in an amount of about 1-3 mM, dextrose in an amount of from about 20 to about 115 mM, nonmetabolizable membrane-protectant sugar in an amount of about 15 to about 60 mM, sodium bicarbonate in an amount from about 20 to about 130 mM, and disodium phosphate in an amount of from about 4 to about 20 mM. In another embodiment the composition consists essentially of adenine in an amount of about 2 mM, dextrose in an amount of from about 60 to about 100 mM, nonmetabolizable membrane-protectant sugar in an amount of about 40 to about 60 mM, sodium bicarbonate in an amount of from about 22 to about 40 mM, and disodium phosphate in an amount of from about 7 to about 15 mM, and in a further embodiment the composition consists essentially of adenine in an amount of about 2 mM, dextrose in an amount of about 80 mM, nonmetabolizable membrane-protectant sugar in an amount of about 55 mM, sodium bicarbonate in an amount of about 26 mM, and disodium phosphate in an amount of about 12 mM, and further wherein the composition has a pH of about 8.5.

It is well known in the red blood cell preservation arts that the concentration of ATP in the red blood cell suspension system is the best correlate of the health of the system. The red blood cell generates ATP through glycolysis via the glycolytic conversion of d-glucose (dextrose) ultimately to lactate. Hence, the concentration curve of lactate is a good indicator of ATP synthesis as well. Regardless of the preservation capacity of the system, red blood cells have a finite life span and the collected red blood cells include a normal distribution of red blood cell ages and proximities to natural death. As no new RBCs are entering the preservation system, there is a limit to the maximum storage period duration that will provide the requisite post-re-infusion in vivo recovery percentage. Hence, the ATP-generating capacity of the system as a whole will decrease over time, though; it is typical to see an initial increase upon addition of an additive fluid as it provides nutrients in higher than natural concentrations.

Without being bound by theory, it is believed that when stored in the composition component of the of the combination storage container and composition for storing red blood cells described herein, the increased volume of nutrient solution allows an increased mass of substrate to be delivered at acceptable concentrations while providing solute for dilution of metabolic waste products thereby reducing feedback inhibition of glucose metabolism. It is further postulated that another feature of the additive solutions of the invention is that they produce swelling of the RBCs initially followed by a gradual reduction of red cell volume during storage. Such a process has been called "regulated volume decrease." It is hypothesized that during this process either the tyrosine phosphatase activity present in the RBC is suppressed or the tyrosine kinase is activated. Both of these enzymes have been demonstrated to be abundant in the membranes of these cells (Zipser, Y. and Kosower, N. S. (1996) Biochem. J. 314:881; Mallozzi C. et al. (1997) FASEB J. 11: 1281). It is anticipated that the net phosphorylation of the band 3 protein in the RBC membrane would result in the release of phosphofructokinase, aldolase and glyceraldehyde-3-phosphate dehydrogenase in the cytoplasm from their bound state to band 3 (Harrison, M. L. et al. (1991) J. Biol. Chem. 266:4106; Cossins, A. R. and Gibson J. S. (1997) J. Exper. Biol. 200:343; Low, P. S. et al. (1993) J. Biol. Chem. 268: 14627; Low, P. S. et al. (1995) Protoplasma 184: 1961. The availability of these three enzymes in the glycolytic pathway would be expected to increase the metabolism of glucose by the RBC, thereby promoting the levels of ATP synthesis and ATP concentration in the RBCs. So, the goal of formulating additive solution compositions is to maintain the ATP synthesis at as high a rate as possible for as long duration as possible.

A key to maximizing the ATP synthesis of the system is to keep the RBC intracellular pH at a level as close to 7.2 as possible without actually reaching it. During storage, the ATP concentration characteristically remains level or even increases for a period of time early in storage and then declines. When the RBC ATP concentration falls below 2.mu.mol/g Hb, RBC recovery is typically below 75%. RBC's lose 2,3-DPG early in storage. The starting concentration is characteristically about 15 umol/g Hb or about 1.1 mol/mol Hb. The concentration typically falls to one-tenth the starting amount in 7 to 10 days. The rate of synthesis of 2,3-DPG is a function of pH, occurring in excess above pH 7.2 but with breakdown favored below that pH. Attempts to increase 2,3-DPG syntheses by increasing storage-system pH have been limited by the mole for mole loss of ATP synthesis with each 2,3-DPG molecule formed. Thus, raising RBC 2,3-DPG concentrations, something previously considered to be desirable, actually tends to reduce RBC storage time.

A more acidic environment diminishes RBC metabolism. The pH of 7.2 is the point wherein a mechanism, known as the Rappaport shunt (see Hess et al. "Alkaline CPD and the preservation of red blood cell 2,3-DPG" (2002) Transfusion, 42:747-752, fully incorporated herein by reference) is triggered whereby 2,3-DPG is synthesized from 1,3-DPG, consuming the phosphate needed for the synthesis of ATP and, additionally, routing around a glycolytic step which produces two of the glycolytically generated ATPs. The net effect to the system is a depletion of ATP. If the intracellular pH can be maintained below 7.2, the shunt is effectively closed down and ATP synthesis is maximized. In a natural state, the shunt operates to some extent and the production and maintenance of some 2,3-DPG is important to other cellular events. However, for purposes of preservation of the red blood cell during storage outside of the in vivo environment, minimization of the shunt operation is desirable.

Therefore, of the composition component of the combination storage container and composition for storing red blood cells, the composition comprises a pH buffering system that is present in an amount sufficient for the composition to be operable to maintain a pH of a red blood cell (RBC) suspension to which the composition is added at a value sufficient to establish and maintain during a storage period a reaction equilibrium in the red blood cell that favors glycolysis over synthesis of 2,3-diphosphoglycerate (DPG) from 1,3-DPG, thereby generating a net gain in adenosine tri phosphate (ATP) synthesis with respect to the reaction equilibrium during the storage period. A specific embodiment provides that the composition is operable to maintain the pH of the RBC suspension to which the composition has been added at between about 6.4 and 7.4. In more specific embodiments, the composition is operable to maintain the pH of the red blood cell (RBC) suspension to which the composition has been added at between 7.0 and less than about 7.2. In very specific embodiments, the composition is operable to maintain the pH of the red blood cell (RBC) suspension to which the composition has been added at a value greater than about 7.1 and less than 7.2.

In further embodiments of the composition component of the combination storage container and composition for storing red blood cells, the composition is substantially free of chloride. This lack of chloride surprisingly yields no negative effect on the system and permits the addition of increased amounts of the buffering system to provide additional pH buffering. In some embodiments, the aqueous composition for storage of red blood cells stores the RBCs at about 1 to about 6° C. This composition comprises: adenine; dextrose; at least one nonmetabolizable membrane-protectant sugar; and a pH buffering system. The pH buffering system comprises a combination of physiologically acceptable buffering agents including at least one agent providing bicarbonate anions, at least one agent providing phosphate anions, and at least one agent providing sodium cations. In some embodiments, the composition (prior to the addition of the red blood cells) does not contain chloride. In some embodiments, the composition (prior to the addition of the red blood cells) does not contain citrate. The pH buffering system is present in an amount sufficient for the composition to be operable to maintain a pH of a red blood cell (RBC) suspension to which the composition is added at a value sufficient to establish and maintain during a storage period a reaction equilibrium in the red blood cell that favors glycolysis over synthesis of 2,3-diphosphoglycerate (DPG) from 1,3-DPG, thereby generating a net gain in adenosine tri phosphate (ATP) with respect to the reaction equilibrium during the storage period. The composition is substantially free of exogenously derived chloride ions. As used herein, "substantially free of exogenously derived chloride ions" is defined as whatever the concentration of chloride ions is given that no source of chloride ions has been added to the composition.

Additional embodiments are directed to a suspension of red blood cells comprising any of the compositions within the blood storage bag, and embodiments wherein the suspension is suitable for direct infusion into a patient in need of such an infusion.

In further embodiments of the composition component of the combination storage container and composition for storing red blood cells, at least one agent providing sodium cations in the composition is selected from the group consisting of sodium bicarbonate, disodium phosphate, monosodium phosphate and combinations thereof. In a more specific embodiment the at least one agent providing bicarbonate anions is sodium bicarbonate. Additional embodiments provide that the at least one agent providing phosphate ions is selected from the group consisting of sodium phosphate, disodium phosphate, trisodium phosphate, and combinations thereof. In more specific embodiments the at least one agent providing phosphate ions is disodium phosphate. In other embodiments of the inventive composition the combination of physiologically acceptable buffering agents additionally comprises at least one agent providing a physiologically acceptable cation selected from the group consisting of $H^+$, potassium, ammonium, magnesium and combinations thereof. In some embodiments, the at least one agent providing sodium cations in the composition is not sodium chloride. In some embodiments, the at least one agent providing sodium cations in the composition is not sodium citrate.

In a further embodiment of the composition component of the combination storage container and composition for storing red blood cells, at least one non-metabolizable membrane-protectant sugar is mannitol. In some embodiments, the at least one non-metabolizable membrane-protectant sugar is a sugar alcohol (e.g., a monosaccharide-derived sugar alcohol). Some sugar alcohols, in particular the monosaccharide-derived sugar alcohols (e.g., sorbitol, mannitol, xylitol, erythritol), are small hydrophilic molecules that appear to diffuse readily through some lipid barriers and may play an important role in cellular stability. Mannitol, in particular, is a known antioxidant that acts as a hydroxyl radical scavenger in vivo. It appears to play a substantial role in the maintenance of cell membrane integrity and is considered a membrane-protectant sugar. Other small polyols may also function as membrane protectant sugars. It is significant to note that glucose and mannitol have the same mole weight, that is, approximately 180 g/mole. Sugar alcohols are not metabolized by the red blood cell.

As used herein, the reported osmolarity is an empirically derived value. Osmolarity is a measure of the osmotic pressure exerted by a solution across a perfect semi-permeable membrane (one which allows free passage of water and completely prevents movement of solute) compared to pure water. Osmolarity is dependent on the number of particles in solution but independent of the nature of the particles. The osmolarity of a simple solution is equal to the molarity times the number of particles per molecule. Real solutions may be much more complex. Proteins with many equivalents/L may only contribute a small amount to the osmolarity, since they consist of a few very large "particles". Not all ions are free in a solution. Cations may be bound to other anions or to proteins. Not all the solution volume is aqueous. To be truly accurate, all these factors should be included in the calculation.

Tonicity, a value highly related to osmolarity and somewhat more useful for describing biocellular conditions, is a measure of the osmotic pressure that a substance can exert across a cell membrane, compared to blood plasma. Osmolarity measures the effective gradient for water assuming that all the osmotic solute is completely impermeant. It is simply a count of the number of dissolved particles. A 300 mM solution of glucose and a 150 mM solution of NaCl each have the same osmolarity, for example. However, a cell placed in each of these solutions would behave very differently. Tonicity is a functional term describing the tendency of a solution to resist expansion of the intracellular volume.

In additional embodiments, the composition component of the combination storage container and composition for storing red blood cells, has an osmolarity of from about 200 to about 340 mOsmol/liter prior to the addition of the red blood cells. In some embodiments the compositions have an osmolarity of from about 210 to about 310 mOsM. In more specific embodiments the compositions have an osmolarity of from about 221 to about 280 mOsmol/liter. In another specific embodiment, the osmolarity is about 244 mOsM (i.e., mOsmol/liter). In another specific embodiment, the osmolarity is about 225 mOsM.

As noted above, RBCs metabolize glucose (d-glucose="dextrose") to make ATP. The waste products are lactate and protons. The protons accumulate, driving down the pH and inhibiting further metabolism. Bicarbonate has been suggested as a buffer system wherein it combines with the protons and, in the presence of RBC carbonic anhydrase, is converted to water and carbon dioxide. In a storage container that permits diffusion of the carbon dioxide, the reverse reaction is prevented and the reaction is driven toward the formation of CO2. A buffering system based on bicarbonate has considerable capacity. Bicarbonate in physiologic concentrations in the additive solution creates the $pCO_2$ in the solution that drives the diffusion of up to 1 to 2 mmol of $CO_2$ from an about an about 100 to about 800 mL capacity PVC bag (or from about 200 to about 700 mL capacity, or from about 400 to about 600 mL capacity PVC bag) each week. However, previous attempts to formulate RBC storage additive solutions with bicarbonate have failed with respect to increasing ATP synthesis and prolonging the effective storage period. For instance, Beutler (BAG-PM) described the addition of bicarbonate to RBC storage solutions, but failed to control for a high pH that led to rapid ATP depletion.

In discovering that saline (i.e., NaCl) is not a necessary ingredient to RBC additive solution compositions, and that the concentration of dextrose could be lowered without negative effects on ATP synthesis, the resultant increased "play" in solution parameters allows the fine-tuning of the pH buffering system. The presently disclosed buffering system provides not only an initially appropriate pH to the additive solution composition, but is able to impart to the RBC suspension a pH that, in turn, modulates the intracellular pH of the RBC to maximize ATP synthesis. The buffering system achieves these pH modulation targets over the storage period. Hence, the buffering capacity or strength of the pH buffering system is deliberately controlled. One embodiment of the present inventive compositions provide that the composition have a pH of from about 8 to about 10.5. In more specific embodiments the pH is from about 8.2 to about 10. In even more specific embodiments the pH of the composition is from about 8.4 to about 9.5. In even more specific embodiments the pH of the composition is from about 8.4 to about 9, and in a very specific embodiment the pH of the composition is about 8.5.

Another embodiment is directed to the inventive compositions wherein the buffering system has a buffering capacity in the red blood cell (RBC) suspension to which the composition is added which increases by at least about 2 mEq between a pH of 6.5 and 7.2 over a storage period of 6 weeks. The presently disclosed buffering system should provide a buffering capacity of at least this value, but is capable of providing even greater buffering capacities to the RBC suspension thereby lengthening the storage period even further.

Ranges for the necessary composition ingredients that permit the instantly disclosed advantages are provided. In one embodiment of the inventive composition, the composition comprises adenine in an amount of about 1-3 mM, dextrose in an amount of from about 20 to about 115 mM, un-metabolizable membrane-protectant sugar in an amount of about 15 to about 60 mM, sodium bicarbonate in an amount from about 20 to about 130 mM, and disodium phosphate in an amount of from about 4 to about 20 mM. In a more specific embodiment the composition comprises adenine in an amount of about 2 mM, dextrose in an amount of from about 60 to about 100 mM, unmetabolizable membrane-protectant sugar in an amount of about 40 to about 60 mM, sodium bicarbonate in an amount of from about 22 to about 40 mM, and disodium phosphate in an amount of from about 7 to about 15 mM. In an even more specific embodiment, the composition comprises adenine in an amount of about 2 mM, dextrose in an amount of about 80 mM, unmetabolizable membrane-protectant sugar in an amount of about 55 mM, sodium bicarbonate in an amount of about 26 mM, and disodium phosphate in an amount of about 12 mM. In some embodiments, the composition has a pH of about 8.5.

In another embodiment, the present invention also provides method embodiments. In one such embodiment a method of preserving red blood cells (RBCs) for a storage period is provided. The method comprises: (a) mixing a sample of collected whole blood containing the RBCs to be stored and plasma with an anticoagulant solution, thereby forming a suspension of collected whole blood; (b) treating the suspension of collected whole blood to deplete the plasma and concentrate the RBCs, thereby forming packed RBCs (either with or without reducing the leukocyte content of blood); (c) mixing the packed RBCs with an amount of an aqueous composition sufficient to form a suspension of RBCs having about 35% to about 80% RBCs by volume; (d) cooling the suspension of RBCs to about 1 to about 6° C.; and (e) storing the cooled suspension of RBCs in a non-DEHP container according to standard bank procedures known in the art. The aqueous composition consists essentially of: adenine; dextrose; at least one non-metabolizable membrane-protectant sugar; and a pH buffering system. The pH buffering system comprises a combination of physiologically acceptable buffering agents including at least one agent providing bicarbonate anions, at least one agent providing phosphate anions, and at least one agent providing sodium cations, wherein the pH buffering system is present in an amount sufficient for the composition to be operable to maintain a pH of a red blood cell (RBC) suspension to which the composition is added at a value sufficient to establish and maintain during a storage period a reaction equilibrium in the red blood cell that favors glycolysis over synthesis of 2,3-diphosphoglycerate (DPG) from 1,3-DPG, thereby generating a net gain in adenosine tri phosphate (ATP) synthesis with respect to the reaction equilibrium during the storage period. The solution is divided in manufacture to separate the dextrose and the phosphate and bicarbonate during heat sterilization.

RBCs useful in the present invention are those that have been separated from their plasma and resuspended in an anticoagulant solution in the normal course of component manufacture. Briefly stated, a standard whole blood sample (450+45 ml) containing RBCs and plasma is mixed with an anticoagulation solution (about 63 ml) to form a suspension of whole blood. Proportional increases or decreases in solution volumes to reflect different donor blood volumes such as 400+40 ml-500+50 ml can also be used. The whole blood suspension is thereafter centrifuged to separate the RBCs from the blood plasma thereby forming packed RBCs. The performance of the overall process is improved by leukocyte reduction using conventional techniques.

Suitable anticoagulants include conventional anticoagulants known for storage of RBCs. Preferably; the anticoagulants include citrate anticoagulants having a pH of 5.5 to 8.0, e.g. CPD, half-strength CPD and the like. The most preferred anticoagulant is CPD or CP2D.

The RBC suspension is then stored in a storage back lacking DEHP, for example, a polyvinyl chloride (PVC) blood storage bags lacking DEHP using either the collection bag or PVC transfer packs of different sizes depending on the volume of the stored aliquot. The RBC suspension is stored at about 1 to 6° C. according to standard blood bank procedure as described in Clinical-Practice of Blood Transfusion editors: Petz & Swisher, Churchill-Livingston publishers, N.Y., 1981. All documents cited herein infra and supra are hereby incorporated by reference thereto.

In a specific embodiment, the suspension of RBCs is suitable for direct infusion into a patient in need of such an infusion. While PVC blood storage bags are the industry-approved standard; the present invention contemplates storage in a wide variety of bags adapted for RBC suspension storage, for example, by including appropriate plasticizers as needed. Ingredients related to the bag or container component of RBC storage technology are not discussed herein but it will be readily apparent to one of ordinary skill in the art that many container technologies may be employed to practice the present invention.

The composition component of the combination storage bag and composition product described herein can also be used to rehydrate lyophilized RBC (e.g., in the thawing of stored frozen blood or blood component (e.g., RBC)), or pathogen inactivated blood or blood component (e.g., RBC).

In specific embodiments of the inventive method of preserving RBCs, the composition contains at least one non-metabolizable membrane-protectant sugar that is a monosaccharide derived sugar alcohol and in a more specific embodiment the non-metabolizable membrane-protectant sugar is mannitol. In additional embodiments of the method, the at least one agent providing sodium cations is selected from the group consisting of sodium bicarbonate, disodium phosphate, and combinations thereof. In specific embodiments the at least one agent providing bicarbonate anions is sodium bicarbonate. Further embodiments are directed to the inventive method of preserving RBCs wherein the at least one agent providing phosphate ions is selected from the group consisting of sodium phosphate, disodium phosphate, trisodium phosphate, and combinations thereof, and in more specific embodiments that at least one agent providing phosphate ions is disodium phosphate. In other embodiments of the inventive method the combination of physiologically acceptable buffering agents additionally comprises at least one agent providing a physiologically acceptable cation selected from the group consisting of H+, potassium, ammonium, magnesium and combinations thereof.

The present invention also provides embodiments preserving RBCs in the combination non-DEHP storage bag and composition wherein the composition, prior to addition of the RBCs, has an osmolarity of from about 200 to about 340 mOsm. In some embodiments the compositions have an osmolarity of from about 210 to about 310 mOsM. In further embodiments the osmolarity of the composition, prior to addition of the RBCs, is from about 221 to about 280 mOsm. In specific embodiments the osmolarity of the composition, prior to addition of the RBCs, is about 225 mOsm. In other embodiments, the composition, prior to addition of the RBCs, has a pH of from about 8 to about 10.5. In specific embodiments the pH is from about 8.2 to about 10. and in more specific embodiments the pH of the composition, prior to addition of the RBCs, is from about 8.4 to about 9.6. In a very specific embodiment the pH of the composition, prior to addition of the RBCs, is about 8.5. An additional embodiment of the combination non-DEHP storage bag and composition for preserving RBCs described herein provides that the buffering system has a buffering capacity in the red blood cell (RBC) suspension to which the composition is added which increases by 2 mEq between a pH of 6.5 and 7.2 over a storage period of 6 weeks, or over a storage period of 8 weeks, or a storage period of 10 weeks, or a storage period of 12 weeks.

The present invention also provides embodiments preserving RBCs in the combination non-DEHP storage bag and composition wherein the composition is operable to maintain the pH of the red blood cell (RBC) suspension to which the composition has been added at between about 6.4 and about 7.4. In specific method embodiments the composition is operable to maintain the pH of the red blood cell (RBC) suspension to which the composition has been added at between 7.0 and less than about 7.2, and in even more specific method embodiments the composition is operable to maintain the pH of the red blood cell (RBC) suspension to which the composition has been added at a value greater than about 7.1 and less than 7.2.

Methods according to the present invention directed to specific ranges of the necessary ingredients of the composition component of the combination storage bag and composition are also provided. In one method embodiment the composition comprises adenine in an amount of about 1-3 mM, dextrose in an amount of from about 20 to about 115 mM, un-metabolizable membrane-protectant sugar in an amount of about 15 to about 60 mM, sodium bicarbonate in an amount from about 20 to about 130 mM, and disodium phosphate in an amount of from about 4 to about 20 mM. In a more specific embodiment the composition comprises adenine in an amount of about 2 mM, dextrose in an amount of from about 60 to about 100 mM, unmetabolizable membrane-protectant sugar in an amount of about 40 to about 60 mM, sodium bicarbonate in an amount of from about 22 to about 40 mM, and disodium phosphate in an amount of from about 7 to about 15 mM, and in a very specific embodiment the composition comprises adenine in an amount of about 2 mM, dextrose in an amount of about 80 mM, unmetabolizable membrane-protectant sugar in an amount of about 55 mM, sodium bicarbonate in an amount of about 26 mM, and disodium phosphate in an amount of about 12 mM, and further wherein the composition has a pH of about 8.5.

In accordance with the present disclosure, the composition (i.e., the additive solution) component of the combination storage bag and composition is added to the packed RBC suspension in an amount sufficient to provide a therapeutically effective amount of in vivo recoverable RBCs in the cell suspension. Preferably, the additive solution is added at a volume ranging from about 60 ml to about 400 ml, preferably about 100 to about 150 ml, most preferably about 110 ml. The solution is typically used in a 1:4.5 volume ratio of solution to whole blood collected (100 mL for a 450 mL whole blood collection, 110 mL for a 500 mL whole blood collection, or equivalent). In specific embodiments of the present inventive methods of preserving RBCs, the volume ratio of the composition to the collected whole blood is about 1:4.5. In a more specific embodiment the volume of the composition is about 110 mL and the volume of the collected whole blood is about 500 mL In further embodiments, the composition (i.e., the additive solution) component of the combination storage bag and composition comprises an aqueous solution of adenine, dextrose, Na2HP04, mannitol, and at least one physiologically acceptable sodium salt, in concentrations suitable to preserve RBCs. In general, the composition may contain adenine from about 1 to 3 mM, dextrose from about 20 to 115 mM, Na 2HP04 from about 4 to 15 mM (where a combination of Na 2HP04 and NaH2P04 can also be used), mannitol from about 15 to 60 mM, and at least one physiologically acceptable sodium salt from about 20 to 130 mM. Preferably, adenine is about 2 mM, dextrose is about 50 to 110 mM, Na 2HP04 is about 9 to 12 mM, mannitol is about 20 to 50 mM, and at least one physiologically acceptable sodium salt is about 25 to 75 mM. Suitable sodium salts useful in the composition include those salt compounds containing a sodium cation which are physiologically acceptable in humans. Non-limiting sodium salts include sodium chloride, sodium acetate, sodium citrate, sodium bicarbonate, and the like. In some embodiments, the sodium salt specifically excludes sodium chloride. In some embodiments, the sodium salt specifically excludes sodium citrate. Of course, once the red blood cells are added to the composition, the red blood cells will add chloride ions (from plasma and the cells themselves) and citrate (from the CPD anti-coagulant). In some embodiments, the composition contains about 0 to 100 mM of sodium chloride and/or 0 to 53 mM of sodium acetate. The pH of the composition (prior to RBC addition) is maintained in a range of about 7 to 10.5 at room temperature. Preferably, the pH of the composition (prior to RBC addition) is in the range of about 8 to 8.8. Most preferably, the pH of the composition is about 8.4 to about 8.6 prior to the addition of any red blood cells.

The osmolarity of the composition (i.e., the additive solution) component of the combination storage bag and composition is in the range of about 200 to 340 mOsM prior to the addition of any red blood cells. In some embodiments the compositions have an osmolarity of from about 210 to about 310 mOsM. Preferably, the osmolarity of the composition (i.e., the additive solution) component of the combination storage bag and composition is in the range of about 221 to 280 mOsM prior to the addition of any red blood cells. Most preferably, the osmolarity of the composition (i.e., the additive solution) component of the combination storage bag and composition is about 221 to 256 mOsM prior to the addition of any red blood cells.

The RBC volume fraction in the cell suspension, i.e., after addition of composition (i.e., the additive solution) component of the combination storage bag and composition, is about 27 to 80% of the total suspension. More preferably, the RBC volume fraction in the cell suspension after addition of composition (i.e., the additive solution) component of the combination storage bag and composition is about 35 to about 50%. Most preferably, the RBC volume fraction in the cell suspension after addition of composition (i.e., the additive solution) component of the combination storage bag and composition is about 43% of the total suspension.

FIG. 1 shows an example of the state of the art. ("Exploratory In Vitro Study of Red Blood Cell Storage Container with an Alternative Plasticizer," Larry Dumont et al. 2009, Oral and Poster Abstract presentation (3149, Basic Science and Clinical Practice in Blood Transfusion Poster II, 51$^{th}$ ASH Annual Meeting and Exposit®, New Orleans, LA). RBCs were collected from healthy volunteer subjects into CPD standard collection sets. The blood was combined into pools of two ABO identical RBCs, divided, leukocyte-reduced, centrifuged and separated into plasma and packed RBC, then additive solution (AS-5) was added to the RBC, and the RBC/AS5 were transferred into 2 study bags (matched pair) for storage up to 42 days under standard blood bank conditions of 4 C. Part A shows in vitro characteristics of stored RBCs in DINCH bags that were mixed weekly (right of part A of FIG. 1), compared with RBCs stored in DINCH bags that were not mixed weekly (left of part A of FIG. 1). Mixing the bags during storage clearly helps the performance of the aqueous composition used in combination with DINCH bags. Part B shows stored RBCs in DEHP bags (without mixing; "Control" under part B of FIG. 1), compared with RBCs stored in DINCH bags (with mixing ("Dinch" under part B of FIG. 1). Each panel represents the results of standard in vitro RBC characteristics determined after 42 days of storage. The top panels show percent hemolysis. The middle panels show extracellular potassium. The bottom panels show ATP. By comparing the results of the performance of aqueous storage compositions in DINCH and DEHP bags of Part B, DINCH bags, with mixing, provided at least equivalent protection against hemolysis and potassium leakage.

Additional data from Larry Dumont et al., supra is provided in Table 3—Day 42 in vitro characterization (mean+/−SD, range; limit of quantitation for DEHP is 0.2 ug/ml).

TABLE 3

|  | Part A—DINCH Bag (n = 6 pools) | | | Part B (n = 6 pools) | | |
| --- | --- | --- | --- | --- | --- | --- |
|  | No Mix | Mixed | p | Control DEHP | DINCH | p |
| Lactate (mM) | 32.7 ± 3.0 27.5-35.0 | 35.1 ± 3.1 30.5-39.0 | 0.011 | 31.1 ± 3.1 27-35.5 | 33.1 ± 2.8 29.5-37.0 | 0.0045 |
| Glucose (mg/dL) | 242 ± 31 215-296 | 242 ± 34 208-298 | 0.905 | 274 ± 3 5 227-321 | 268 ± 37 221-319 | 0.0255 |

TABLE 3-continued

|  | Part A—DINCH Bag (n = 6 pools) | | | Part B (n = 6 pools) | | |
| --- | --- | --- | --- | --- | --- | --- |
|  |  |  |  | Control | | |
|  | No Mix | Mixed | p | DEHP | DINCH | p |
| Morphology RBC (0-100) | 48 ± 15<br>23-60 | 58 ± 14<br>42-73 | 0.01 | 64 ± 6<br>54-68 | 62 ± 10<br>51-75 | 0.6724 |
| MCV (fL) | 100 ± 2.9<br>97-105 | 98.7 ± 2.7<br>96-103 | 0.0002 | 101.6 ± 3.7<br>98-107.8 | 100.6 ± 3.7<br>96.9-106.4 | 0.0055 |
| Supernatant DEHP (µg/ml) | ND | ND | — | Median = 14.9<br><0.2-31.1 | <0.2 | — |

These results showed that periodic mixing of RBC stored in DINCH bags provided additional protection against hemolysis over 42 days of storage. DINCH plasticizer provided at least equivalent protection against hemolysis and potassium leakage for RBC stored in additive solution for 42 days.

However, periodic mixing is not practical with current blood banking methodologies. The combination product and methods described herein provide means for storing red blood cells for at least 42 days without having to periodically mix the stored red blood cells.

Accordingly, a study was done comparing the hemolysis levels of red blood cells stored either in SOLX® (also called EAS-81 and AS-7) additive solution within either a DEHP bag, a DINCH bag, or a BTHC bag. To do this, the pooled whole blood collected (plus CPD) was processed using standard blood bank procedures, either within eight hours after collection or after a room temperature hold of 24 hours. The resulting packed RBCs were then combined with SOLX additive solution, split into various test groups and stored either in DEHP (black bars in FIG. 2), DINCH (medium gray bars in FIG. 2), or BTHC (light gray bars in FIG. 2) bags. Hemolysis was sampled weekly at weeks five through nine, as compared to DEHP as the control (hence, the DEHP bars (black) are always 1.0 in FIG. 2). ATP was measured at eight weeks. Morphology of the RBCs was scored at eleven weeks. As shown in FIG. 2, the mean hemolysis ratio (hemolysis standardized in each pool by DEHP unit) shows that RBCs stored in alternatively plasticized PVC containers result in an average of 50% higher hemolysis than in DEHP plasticized containers. The higher hemolysis observed with alternative plasticizers are consistent with those reported in the literature for RBCs stored in conventional additives.

Further experiments led to the surprising discovery that improvement in the RBC integrity and storage capabilities observed with RBCs stored in a composition consisting essentially of adenine in an amount of about 1-3 mM, dextrose in an amount of from about 20 to about 115 mM, unmetabolizable membrane-protectant sugar in an amount of about 15 to about 60 mM, sodium bicarbonate in an amount from about 20 to about 130 mM, and disodium phosphate in an amount of from about 4 to about 20 mM stored in a non-DEHP container as compared to AS-1 RBCs stored in standard DEHP containers will negate the lower RBC integrity and higher hemolysis observed with RBCs stored in alternative plasticized PVC containers.

A study that compared RBCs stored in DINCH containers lacking DEHP in a composition consisting essentially of adenine in an amount of about 1-3 mM, dextrose in an amount of from about 20 to about 115 mM, unmetabolizable membrane-protectant sugar in an amount of about 15 to about 60 mM, sodium bicarbonate in an amount from about 20 to about 130 mM, and disodium phosphate in an amount of from about 4 to about 20 mM, a preferred embodiment, to RBCs stored in DEHP containers in AS-1 additive solution was next performed.

This paired study was carried out by collecting whole blood units into CPD, as is standard, pooling ABO compatible units in pairs, and then splitting them into individual blood units of equivalent volume. The ten pools were filtered and leukocyte reduced. The resulting RBCs were packed and the plasma drawn off following standard procedures. The packed RBCs were then resuspended in either the composition of a preferred embodiment (in this case, SOLX) or AS-1, and stored in DTNCH and DEHP containers, respectively.

Specifically, the following was done: Whole blood (WB) units (500±50 mL) were collected into Fenwal 500 mL collection sets with 70 mL CPD anticoagulant. Pairs of ABO/Rh compatible units were pooled and equally split between LEUKOSEP® HWB-600-XL Whole Blood Leukocyte Reduction Filtration System with SOLX®/DINCH® (Test) and a Blood-Pack Unit with Integral RZ2000 W B Leukocyte Reduction Filter with AS-1/DEHP (Fenwal Inc., Lake Zurich, IL) (Control). Test and Control sets were previously drained of anticoagulant.

WB units were filtered and processed at room temperature (RT) within eight hours of collection. Test units were filtered using the LEUKOSEP® HWB-600-XL filter and Control units using the RZ-2000 filter. WB was centrifuged, plasma removed and 110 mL SOLX® added to the Test RBC units and 110 mL AS-1 added to the Control RBC units.

RBC were stored for 42 days at 1-6° C. without periodic mixing. Testing was performed on WB post-filtration and RBC on Days 0 and 42 of storage. Evaluations included residual WBC (BD FACS Calibur), CBC (Sysmex XE-2100D), blood gases (Roche Cobas b 221), supernatant hemoglobin (HemoCue Plasma/Low Hb), ATP (Rolf Greiner), RBC morphology, microvesicle protein analysis, and DINCH® and DEHP levels.

Data was collected on ten pairs of WB units. All Test and Control units had a post-filtration rWBC content of $<5\times10^6$/unit. Results of in vitro measurements are presented in Table 4.

TABLE 4

|  | Day 0 (Post-Processing) | | Day 42 | |
| --- | --- | --- | --- | --- |
|  | Test (SOLX/DINCH) | Control (AS-1/DEHP) | Test (SOLX/DINCH) | Control (AS-1/DEHP) |
| Hemolysis (%) | 0.3 +/− 0.2 | 0.2 +/− 0.00 | 0.36 +/− 0.12 | 0.35 +/− 0.13 |
| ATP (μmol/gHb) | 3.97 +/− 0.28 | 4.20 +/− 0.34 | 3.55 +/− 0.51* | 3.40 +/− 0.42 |
| ATP (% of Day 0) | NA | NA | 89.2 +/− 9.8* | 80.8 +/− 6.3 |
| Potassium (mEq/L) | 0.79 +/− 0.14 | 0.71 +/− 0.18 | 45.4 +/− 4.2* | 43.8 +/− 3.8 |
| RBC Morphology (0-100) | 98.9 +/− 0.6 | 97.0 +/− 2.3 | 67.5 +/− 11.7 | 66.7 +/− 12.0 |
| Microvesicle Protein (mg/100 mL RBC) | NA | NA | 21.5 +/− 7.0* | 24.9 +/− 4.8 |
| DINCH (ppm) | <1.0** | NA | 2.50 +/− 7.0* | NA |
| DEHP (ppm) | <1.0** | <1.0** | <1.0** | 20.9 +/− 5.0 |

Mean +/− standard deviation
N = 10
*Statistically significant difference from Day 42 Control (p < 0.05)
**Lower Limit of Quantitation = 1.0 ppm From these studies, it was found that RBC stored in DINCH plasticized PVC bags and SOLX additive demonstrated comparable quality measures as compared to conventional licensed AS-1 stored in DEHP plasticized containers. The results demonstrated the potential cold storage of SOLX RBC in DINCH PVC containers for 42 days utilizing a standard additive volume (110 mL per 500 m L WB collection) and without mixing, specialized equipment or processing.

During 42 days of storage, hemolysis was <0.59% for both Test and Control RBC. Potassium levels were statistically higher for Test RBC compared to Control, but were not considered to be clinically significant.

FIG. 3 shows the result of the morphology scoring at day 42 of storage. The composition of a preferred embodiment (SOLX, in this case) in DINCH bags shows almost identical results to AS-1 in DEHP bags. FIG. 4 shows the amount of microvesicle protein after 43 days of storage in the two study groups. As microvesicles are an indicator of cell damage and death, the less protein measured, the better the cells' health is considered to be. The SOLX composition of a preferred embodiment in DINCH containers surprisingly showed a statistically significant (p<0.05) improvement over the conventional AS-1/DEHP combination. FIG. 5 shows the amount of ATP (as a percentage of initial ATP levels) in the two study groups. ATP is a well-known corollary of RBC health. Again, the SOLX/DINCH combination showed a statistically significant (p<0.05) greater amount of ATP at the end of 42 days than found for the AS-1/DEHP combination. Further, and potentially even more surprising, hemolysis (as measured by percent of hemoglobin content), as shown in FIGS. 6A and 6B (FIG. 6A shows the mean of the ten pools, FIG. 6B shows the individual pools) was almost identical between the two groups.

The results in FIGS. 3-6B are particularly compelling because there were no statistical differences in residual white blood cell content (see FIG. 7), residual hemoglobin content (see FIG. 8), red blood cell recovery after filtration (see FIG. 9) or the volume of the whole blood cell unit (FIG. 10) between the SOLX/DINCH bag sample and the AS-1/DEHP bag sample prior to storage. Thus, the results in FIGS. 3-6 were not due to any differences in the whole blood or red blood cells themselves. Rather, the surprising results must be attributed to the fact that the additive solution described herein provides such a beneficial environment in which to store RBCs, that it compensates for the lack of beneficial effect provided for by the DEHP plasticizer found in PVC blood storage containers widely used today. Most surprisingly of all, a non-limiting composition described herein, namely the SOLX additive solution, in DINCH plasticized containers actually performed better than currently available storage compositions/plasticizer combinations.

The above examples are provided for illustrative purposes only and should not be construed as limiting the scope of the present invention as defined herein by the claims. Thus, it is within the scope of the claimed invention to include PVC blood storage containers made with other non-DHEP plasticizers, as defined above.

Figure 11:
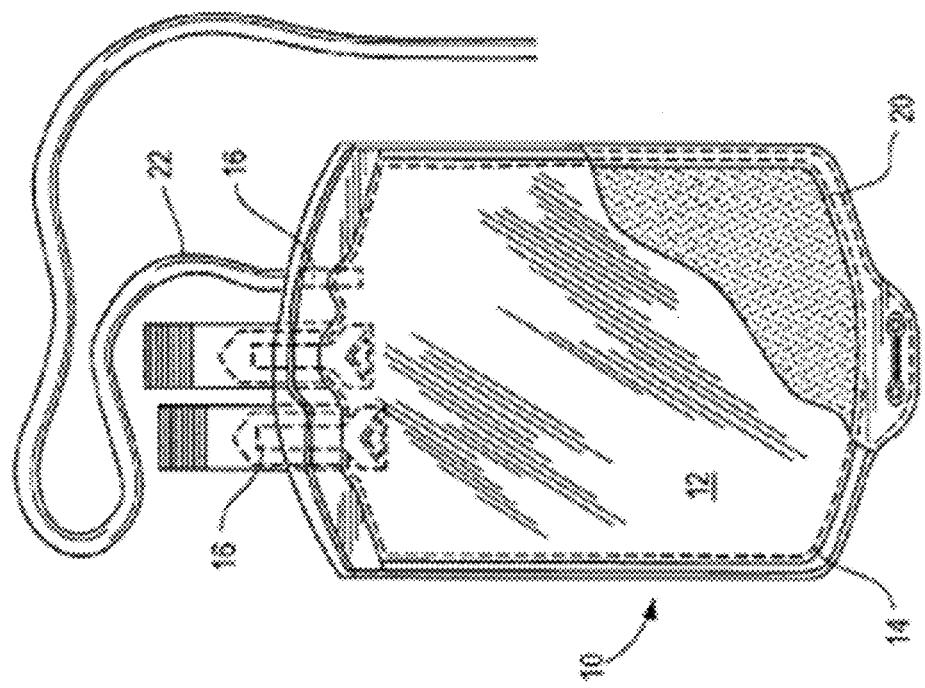
FIG. 11 is a plan view of a typical RBC storage container for use as described herein.
Figure 12:
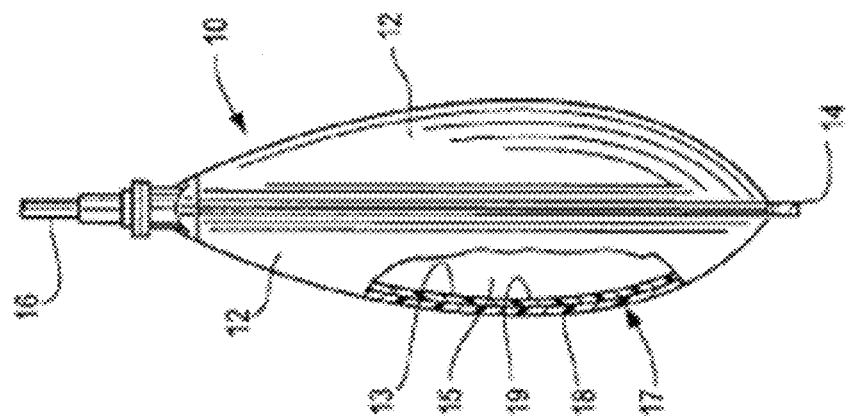
FIG. 12 is a side view of the container of FIG. 11.

Containers for storing the RBC compositions disclosed herein may be permeable to oxygen or at least semi-permeable to oxygen. As shown in FIGS. 11 and 12, container 10 may include one or more container walls 12 which define an interior chamber 15 for receiving the RBC composition 20. In one embodiment, two sheets made of a plastic material are brought together and sealed along their peripheries 14 to form container 10. Other ways of making container 10 will be known to those of skill in the art and are within the scope of the present disclosure. As shown in FIG. 8, container wall 12 includes an inner surface 13 which contacts the RBCs and an outer surface 17. In one embodiment, container wall may be made of a single layer of a polymer material, such as PVC or non-PVC polymer or polymer blend. In another embodiment, container wall 12 may be made of a multiple sheet laminate wherein inner surface 13 is made of one material and outer surface 17 is made of a different material. Container 10 may include one or more access ports 16 for connection with tubing 22, docking devices and the like to establish flow into and out from the interior chamber 15 of container 10.

In one embodiment, containers useful in the storage of RBCs as described above include container walls that are made in whole or at least in part of a plastic material that may include at least one or more polymeric compounds. The one or more plastic and/or polymeric compounds may be blended together and formed into flat sheets that are sealed together in the manner described above. The polymeric material may be made from or otherwise include polyvinyl chloride (PVC) or one or more non-PVC polyolefin homopolymers, copolymers or blends thereof. Examples of suitable non-PVC polyolefins include polypropylene, polyethylene, including ultra low density polyethylene (ULDPE) and very low density polyethylene (VLDPE). Other suitable compounds that may be used in the plastic materials of the containers or as part of the blend for making the plastic materials include ethylene vinyl acetate (EVA) and block copolymers such as Kraton®. Exemplary formulations and/or the polyolefins, polyolefin blends or other polymeric compounds which are useful, either alone or in combination, in the manufacture of containers suitable for use in the RBC products of the present disclosure are described in U.S. Pat. Nos. 5,026,347, 4,140,162, 5,849,843, and 6,579,583, all of which are incorporated herein by reference in their entireties.

As indicated above, the structure of the container or container wall may include one, two or more layers. The layer formulations may include one, two, three or more components. These structures should be suitable for sterilization by appropriate means, such as steam, ionizing radiation or ethylene oxide.

Structures suitable for steam sterilization should resist distortions to high temperatures up to 121° C. This typically requires incorporation of materials with a melting peak of greater than 130° C. The preferred structure of autoclavable material suitable for the invention will incorporate polypropylene homopolymer or copolymer at a level of 30% or more in at least one of the layers to provide thermal resistance. A suitable polypropylene copolymer is supplied by Total Petrochemicals (random copolymer 6575). However, thermal resistance can also be obtained by crosslinking a lower melting material. For example, a 28% vinyl acetate EVA can be crosslinked by ionizing radiation sufficiently to withstand autoclave temperatures even though it has a melting point of 76° C. Suitable materials include Arkema Evatane® 28-03 and Celanese Ateva® 2803. The preferred structure is highly flexible, having a composite modulus of not more than 20,000 psi.

In some cases, it may be desirable for the structure to have radio frequency (RF) response to enable heat sealing. This can be accomplished by incorporating an RF responsive material such as described in U.S. Pat. No. 5,849,843.

Preferred structures for radiation sterilized applications will incorporate at least 30% of an ethylene based polymer (LDPE, LLDPE, ULDPE, VLDPE, EVA) in at least one of the layers. Structures of polypropylene copolymers and polypropylene polymers blended with elastomers such as Kraton® or ULDPE are also suitable for radiation sterilized applications. The preferred structure incorporates lower modulus components in at least one of the layers to enhance flexibility and toughness. These lower modulus components can be ultra low density polyethylene (ULDPE—typical density less than 0.90 Kg/L), very low density polyethylene (VLDPE—typically density less than 0.925 Kg/L), ethylene vinyl acetate copolymers (EVA) with greater than 16% vinyl acetate content, styrene butadiene terpolymers such as Kraton®. ULDPE materials are commercially available as Mitsui TAFMER®, Exxon Mobil Exact® and Dow Affinity®. EVA materials are available as Arkema Evatane® and Celanese Ateva®. These materials are incorporated at levels sufficient to obtain a composite modulus of less than 20,000 psi while maintaining resistance to distortion at temperatures greater than 121° C. for autoclaved applications. The disclosure of suitable non-PVC plastics set forth above is not meant to be exhaustive and it will be appreciated that other non-PVC plastics, polymers and blends thereof may also be used in the products and compositions of the present disclosure. Containers of the type described herein may have a container sheet (wall) thickness of between approximately 0.010 to 0.018 inches. They may include a non-smooth or any surface finish that minimizes sheet sticking. Typically, containers of the type described herein may have a container volume (i.e., interior chamber volume) of approximately 150 ml to 4 L.

As discussed above, containers useful in the methods, systems, and products disclosed herein may include PVC or be substantially free of PVC. Thus, in one embodiment, with reference to FIG. 11, the formulations used to make container walls 12 of container 10 are at least substantially free of polyvinylchloride (PVC). At the very least, surface 13 of container wall 12 is substantially free of PVC. In an embodiment where container 10 is made of a multiple sheet laminate the sheet providing inner surface 13 may be made substantially of a non-PVC material while the sheet providing outer surface 17 may be made of a different material. More typically, however, the container wall 12 may be made of a single sheet of a non-PVC polyolefin, as described above.

In some embodiments, even in containers where the walls 12 are made without PVC, some PVC may be present in small amounts. For example, ports 16 may include plasticized PVC. In any event, as used herein, the terms "substantially PVC-free" or "substantially free of PVC" refer to containers in which the walls that are in contact with the RBC composition, i.e., that part of the container that makes up a part of the storage environment, are made from a material that is free of PVC.

Containers suitable for use in the products, systems and methods of the present disclosure are at least substantially free of phthalate plasticizer, such as DEHP. This applies to containers where the polymeric material is PVC plastic as well as where the polymeric material is a non-PVC plastic. In the case of a container that includes PVC, such container material will have to be plasticized due to the brittle nature of PVC. As noted above, the plasticizer is a non-phthalate plasticizer. Non-phthalate plasticizers that may be suitable for use in the PVC containers described above include, for example, triethylhexyltrimellitate (TEHTM) and the family of citrate esters, as described in U.S. Pat. No. 5,026,347.

Preferably, the PVC may be plasticized with 1,2-cyclohexane dicarboxylic acid diisononyl ester, known by its trade name, DINCH. In an embodiment where the polymer in the container material formulation is PVC, at least 10%, by weight, of the formulation is preferably one or more preferably hemolysis-suppressing, non-phthalate plasticizers such as DINCH or a citrate ester such as n-butyryltri-n-hexyl citrate. In an embodiment, PVC containers of the type described above may include approximately 55-80%, by weight, PVC resin and approximately 20-45%, by weight, of non-phthalate plasticizer(s) wherein a preferred plasticizer is DINCH, and less than about 3.0% of stabilizers and lubricants. In a more specific embodiment, containers of the type described above may include approximately 60-70% PVC resin, 20-35% DINCH plasticizer, approximately 4-10% epoxidized oil and approximately 0.5-3.0% additional co-stabilizers and lubricants. DINCH is available from, for example, BASF of Ludwigshafen, Germany.

In the case of non-PVC containers, such containers may likewise be free of phthalate plasticizers but include non-phthalate plasticizer. With respect to either the PVC or the non-PVC containers, at least a portion of the container wall, i.e., the portion or surface that is in contact with the RBCs during storage, is at least substantially free of phthalate plasticizer. For example, with reference to FIG. 12, at least inner surface 13 (or that portion of inner surface 13 that is in contact with the RBCs) may be substantially free of phthalate plasticizer. Thus, the storage environment in which the RBCs reside is at least substantially free of phthalate plasticizer. In a more specific embodiment, the storage environment in which the RBCs reside is at least substantially free of phthalate plasticizer, includes a non-phthalate plasticizer and further includes a suitable storage solution (such as those previously described).

Thus, for example, the PVC or non-PVC container (or more specifically, the container wall) is at least substantially free of a phthalate plasticizer but may include a non-phthalate plasticizer or extractable agent such as the citrate esters described in U.S. Pat. No. 5,026,347, or the DINCH plasticizer described above. Accordingly, such non-phthalate plasticizer(s) will be present in and part of the RBC storage environment. As the containers disclosed herein are often part of a larger processing set that includes tubing, ports, membranes and connectors in addition to being part of the storage environment, non-PVC and non-phthalate materials of the type described herein may also be used in the manufacture of such other processing set components.

In the embodiments described above, where the plastic container material may be PVC or a non-PVC composition, where no phthalate plasticizer or agent is included, and the material includes a single non-phthalate plasticizer (such as DINCH), a hypotonic, high pH storage media may preferably be used in the red blood cell composition. RBC compositions may be stored in the substantially phthalate-free containers. The RBC compositions stored in such containers may be stored for more than 21 days, more than 35 days and up to at least 42 days or even up to at least 49 days and/or 56 days, while maintaining acceptable storage cell function parameters (i.e., a level of ATP, 2,3-DPG, lactate). In particular, RBC compositions stored in the containers described above and that are substantially phthalate-free maintain hemolysis levels below 1.0% and even below 0.8% at, for example, 42 days of storage. Similarly, the RBC compositions stored for at least about 42 days also include ATP, 2,3-DPG, lactate, potassium, phosphate levels that are comparable to RBC compositions stored in plasticized PVC containers.

In another embodiment, the plastic composition may include two or more plasticizers or extractable agents. The plastic container material may be either PVC or the non-PVC materials described above. Likewise, the structure of the container may also be as described above (single layer or multiple layers). Thus, in such an embodiment, the plastic composition may include a first extractable agent and a second extractable agent. At least one of the agents is preferably a non-phthalate extractable agent/plasticizer (e.g., not DEHP). In some embodiments, none of the agents is DEHP. In an embodiment where both the first and the second extractable agents/plasticizers are non-phthalate plasticizers, one of the agents/plasticizers may be a non-phthalate, extractable agent that can suppress hemolysis such as, but not limited to, the citrate ester n-butyryl-n-hexyl citrate (BTHC). More preferably, at least the first and second extractable agents or plasticizers are extractable agents or plasticizers, each effective in suppressing hemolysis in RBCs. Thus, in the embodiment where BTHC is one of such extractable hemolysis-suppressing agents, the other of the at least first or second agents or plasticizers may be a non-phthalate plasticizer, such as DINCH, which also is effective in suppressing hemolysis.

In another embodiment, the plastic composition may include a first and second extractable agent/plasticizer (wherein one of the first or second agents/plasticizers is preferably BTHC) and a further or third agent or plasticizer. The further or third agent/plasticizer may likewise be a non-phthalate agent/plasticizer. The third plasticizer may be a plasticizer that is not readily extractable or marginally extractable, such as TEHTM or epoxidized oil (which also acts as a stabilizer). Alternatively or in addition, the third (or further) plasticizer may be more readily extractable, such as the citrate ester acetyltri-nbutyl citrate (ATBC), which is also effective in suppressing hemolysis, or DINCH. Additional agents or plasticizers may further be included in the formulation of the containers described herein.

In a more specific embodiment, where the polymer in the container material formulation is PVC, at least 10%, by weight, of the formulation includes preferably two or more non-phthalate plasticizers wherein one of the plasticizers is DINCH or a citrate ester such as n-butyryltri-n-hexyl citrate (BTHC). In an embodiment, containers of the type described above may include approximately 55-80%, by weight, PVC resin and approximately 20-45%, by weight, of at least first and second phthalate plasticizer(s) wherein a preferred plasticizer is BTHC and/or DINCH, and less than about 3.0% of stabilizers and lubricants. In a more specific embodiment, containers of the type described above may include approximately 60-70% PVC resin, 15-30% DINCH plasticizer, 5-15% BTHC, approximately 4-10% epoxidized oil and approximately 0.5-3.0% of additional co-stabilizers and lubricants. DINCH is available from, for example, BASF of Ludwigshafen, Germany.

In another embodiment, the plastic composition may include approximately 55%-80%, by weight, PVC and approximately 20%-45% hemolysis-suppressing plasticizer/agent wherein, as a percentage of the overall composition, approximately 3-25% and more preferably 5%-15%, by weight, is a first plasticizer/agent capable of suppressing hemolysis, such as BTHC. In accordance with the present disclosure, the plastic composition may include 55%-80%, by weight, PVC and approximately 20%-45%, by weight, of combined hemolysis-suppressing plasticizer/agent wherein, as a percentage of the overall composition, approximately 5-15% is BTHC, 2-12% epoxidized oil and 15-30% is one or more of ATBC, DINCH or other extractable agents, each of which is effective to suppress hemolysis in red blood cells, with approximately 0.5-3.0% of additional co-stabilizers and lubricants.

The compositions of the present disclosure may also include other additives such as anti-blocking and slip agents. Examples of such anti-blocking and slip agents include derivatives of fatty acid and ethylenediamine. More specifically, the agents may be longer chain fatty acids, containing 12 or longer hydrocarbon chains with or without mono-unsaturated carbon-carbon bonds, based diamide with ethylendiamine, such as n,n'-ethylene bisstearamide and n,n'-dioleoyl ethylenediamine. Commercially available compounds of the type described above and which may be used in the non-PVC, non-plasticized compositions of the present disclosure include Acrawax and Glycolube, both available from Lonza of Basel, Switzerland. The anti-blocking and/or slip agents may be coated onto the interior surface of the containers or otherwise incorporated therein.

Compositions that include two or more preferably non-phthalate plasticizers or extractable agents are suitable for storing concentrated RBCs with an additive solution. In such applications, any additive solution may be used.

In the embodiments where the container walls (or at least the inner surface(s) 13 of the walls) are made of a material completely free of phthalate, some small trace amounts of phthalate may be present in the container walls as a result of migration from adjoining or adjacent containers, from PVC tubing and/or the surrounding environment generally. In addition, as described above, ports 16 may likewise include PVC and as a result may include some plasticizer (including DEHP). Nonetheless, the presence of some trace amounts of plasticizer attributable to migration from other containers or tubing, or present in the plastic ports 16, is negligible and such containers are referred to herein as "substantially phthalate-free" or "substantially free of phthalate."

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for storing red blood cells (RBCs) from a donor comprising:
   (a) concentrating red blood cells to obtain packed RBCs;
   (b) mixing the packed RBCs with an amount of an aqueous composition sufficient to form a RBC suspension having about 35% to about 80% RBCs by volume;
   (c) cooling the RBC suspension to about 1 to about 6° C.; and
   (d) storing the cooled RBC suspension in a DEHP-lacking blood storage container without periodic mixing according to standard blood bank procedures, wherein the aqueous composition comprises adenine, dextrose, at least one non-metabolizable membrane-protectant sugar, and a pH buffering system, wherein the pH buffering system consists of a combination of physiologically acceptable buffering agents including at least one agent providing bicarbonate anions, at least one agent providing phosphate anions, and at least one agent providing sodium cations, wherein the aqueous composition is substantially free of exogenously derived chloride ions,
   wherein the red blood cell (RBC) suspension stored without periodic mixing under standard blood banking procedures for a storage period of 42 days will meet US regulatory standards for said storage period of 42 days, wherein the RBCs have a level of hemolysis below about 1.0% with 95% confidence and 95% reliability for at least 42 days storage.

2. The method of claim 1, wherein the packed RBCs are concentrated using erythrocytapheresis.

3. The method of claim 1, wherein the packed RBCs are concentrated using a method selected from the group consisting of centrifugation, filtration, and erythrocytapheresis.

4. The method of claim 1, wherein the RBC suspension comprises about 55% RBCs in the aqueous composition.

5. The method of claim 1, wherein said DEHP-lacking blood storage container comprises a polyvinyl chloride (PVC) material.

6. The method of claim 1, wherein said DEHP-lacking blood storage container comprises a non-polyvinyl chloride (PVC) material.

7. The method of claim 1, wherein the DEHP-lacking blood storage container comprises a non-phthalate plasticizer.

8. The method of claim 7, wherein the non-phthalate plasticizer is 1,2-cyclohexane dicarboxylic acid diisononyl ester (DINCH).

9. The method of claim 7, wherein the non-phthalate plasticizer is selected from the group consisting of di, (2, ethyl, hexyl) terephthalate (DENT). butyl-n-trihexyl-citrate (BTHC); trimellitates; citrates such as citrate ester acetyltri-nbutyl citrate (ATBC); tri, (2-ethyl hexyl) trimellitate (TEHTM); 1,2-cyclohexane dicarboxylic acid diisononyl ester (DINCH), and a combination of two or more selected from the group consisting of di, (2, ethyl, hexyl) terephthalate (DENT). butyl-n-trihexyl-citrate (BTHC); trimellitates; citrates such as citrate ester acetyltri-nbutyl citrate (ATBC); tri, (2-ethyl hexyl) trimellitate (TEHTM); and 1,2-cyclohexane dicarboxylic acid diisononyl ester (DINCH).

10. The method of claim 1, wherein adenine is present in an amount of between about 1 mM to about 3 mM.

11. The method of claim 1, wherein dextrose is present in an amount of between about 20 mM to about 115 mM.

12. The method of claim 1, wherein the unmetabolizable membrane-protectant sugar is present in an amount of between about 40 mM and about 60 mM.

13. The method of claim 1, wherein the unmetabolizable membrane-protectant sugar is mannitol.

14. The method of claim 1, wherein the physiologically acceptable sodium salt is selected from the group consisting of sodium bicarbonate and disodium phosphate.

15. The method of claim 1, wherein the at least one agent providing bicarbonate anions is sodium bicarbonate.

16. The method of claim 15, wherein the sodium bicarbonate is present in an amount of between about 20 mM and about 130 mM.

17. The method of claim 1, wherein the at least one agent providing phosphate anions is disodium phosphate.

18. The method of claim 17, wherein the disodium phosphate is present in an amount of between about 4 mM and about 20 mM.

19. The method of claim 1, wherein the osmolarity of the aqueous composition is between about 210 mOsmoles/liter and about 340 mOsmoles/liter.

20. The method of claim 1, wherein the aqueous composition comprises:
   adenine at about 1 mM to about 3 mM;
   dextrose at about 20 mM to about 115 mM;
   disodium phosphate at about 4 mM to about 20 mM;
   at least one non-metabolizable membrane-protectant sugar at about 15 to about 60 mM; and
   a physiologically acceptable sodium salt at about 20 mM to about 130 mM.

21. The method of claim 1, wherein the aqueous composition consists essentially of:
   adenine in an amount of about 2 mM,
   dextrose in an amount of about 80 mM,
   disodium phosphate in an amount of about 12 mM,
   mannitol in an amount of about 55 mM, and
   sodium bicarbonate in an amount of about 26 mM.

22. The method of claim 1, the amount of aqueous solution of step (b) is from about 60 mL to about 400 mL.

23. The method of claim 1, the amount of aqueous solution of step (b) is from about 100 mL to about 150 mL.

24. The method of claim 1, the amount of aqueous solution of step (b) is 110 mL.

25. The method of claim 1, wherein the red blood cells of step (a) are concentrated from a volume of whole blood collected from the donor.

26. The method of claim 22, wherein the amount of aqueous solution of step (b) is in a 1:4.5 volume ratio of aqueous solution to the volume of whole blood.

* * * * *